United States Patent
Budagavi et al.

(10) Patent No.: US 11,259,048 B2
(45) Date of Patent: Feb. 22, 2022

(54) ADAPTIVE SELECTION OF OCCUPANCY MAP PRECISION

(71) Applicant: Samsung Electronics Co., Ltd., Suwon-si (KR)

(72) Inventors: Madhukar Budagavi, Plano, TX (US); Hossein Najaf-Zadeh, Allen, TX (US); Rajan Laxman Joshi, San Diego, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 203 days.

(21) Appl. No.: 16/730,321

(22) Filed: Dec. 30, 2019

(65) Prior Publication Data

US 2020/0221125 A1    Jul. 9, 2020

Related U.S. Application Data

(60) Provisional application No. 62/790,127, filed on Jan. 9, 2019, provisional application No. 62/815,059, filed on Mar. 7, 2019, provisional application No. 62/823,336, filed on Mar. 25, 2019, provisional application No. 62/857,094, filed on Jun. 4, 2019, provisional application No. 62/938,409, filed on Nov. 21, 2019.

(51) Int. Cl.
*H04N 19/597* (2014.01)
*G06T 3/00* (2006.01)

(52) U.S. Cl.
CPC ......... *H04N 19/597* (2014.11); *G06T 3/0031* (2013.01)

(58) Field of Classification Search
CPC .............................. H04N 19/597; G06T 3/0031
USPC .................................................... 375/240.08
See application file for complete search history.

(56) References Cited

U.S. PATENT DOCUMENTS

| | | | |
|---|---|---|---|
| 8,731,313 B2 | 5/2014 | Thiyanaratnam et al. |
| 8,811,758 B2 | 8/2014 | Paffenroth et al. |
| 9,753,124 B2 | 9/2017 | Hayes |
| 2017/0214943 A1 | 7/2017 | Cohen et al. |
| 2017/0347100 A1 | 11/2017 | Chou et al. |

(Continued)

FOREIGN PATENT DOCUMENTS

| KR | 10-2018-0071928 A | 6/2018 |
|---|---|---|
| WO | 2020141946 A1 | 7/2020 |

OTHER PUBLICATIONS

Eurico Manuel Rodrigues Lopes, "Adaptive Plane Projection for Video-based Point Cloud Coding", Nov. 30, 2018, 114 pages.

(Continued)

*Primary Examiner* — On S Mung

(57) ABSTRACT

An encoding device, a method of encoding, and decoding device for point cloud compression of a 3D point cloud. The encoding device is configured to generate, for the three-dimensional (3D) point cloud, at least a set of geometry frames and a set of occupancy map frames for points of the 3D point cloud. The encoding device is also configured to select an occupancy precision value based on a quantization parameter (QP) associated with at least one generated geometry frame in the set of geometry frames, subsample at least one occupancy map frame in the set of occupancy map frames based on the selected occupancy precision value, and encode the set of geometry frames and the set of occupancy map frames into a bitstream for transmission.

20 Claims, 25 Drawing Sheets

(56) References Cited

U.S. PATENT DOCUMENTS

| | | |
|---|---|---|
| 2018/0173239 A1 | 6/2018 | Toon et al. |
| 2018/0268570 A1 | 9/2018 | Budagavi et al. |
| 2020/0105025 A1* | 4/2020 | Yea ...................... H04N 19/597 |
| 2021/0099701 A1* | 4/2021 | Tourapis .............. H04N 19/117 |

OTHER PUBLICATIONS

Xu Yiling et al., "Introduction to Point Cloud Compression", ZTE Communications, vol. 16, No. 3, Aug. 24, 2018, 6 pages.

International Search Report dated Apr. 20, 2020 in connection with International Patent Application No. PCT/KR2020/000327, 3 pages.

Written Opinion of the International Searching Authority dated Apr. 20, 2020 in connection with International Patent Application No. PCT/KR2020/000327, 4 pages.

"Spherical Video V2 RFC (draft)", dated May 3, 2017, 11 pages. https://github.com/google/spatial-media/blob/master/docs/spherical-video-v2-rfc.md.

Budagavi et al., "OMAF: Extensible Polygon-based Projection Format (EPPF) for VR/360 Video", ISO/IEC JTC1/SC29/WG11 MPEG2017/m39947, Jan. 2017, 4 pages.

Mammou et al., "Second Working draft for Video-based Point Cloud Coding", ISO/IEC JTC1/SC29/WG11, MPEG 2018/N17771, Jul. 2018, 45 pages.

Mammou et al., "Information technology—Coded Representation of Immersive Media—Part 5: Video-based Point Cloud Compression", ISO/IEC JTC1/SC29/WG11 N18030, Oct. 2018, 73 pages.

Extended European Search Report dated Jan. 5, 2022 regarding Application No. 20738317.5, 9 pages.

"Algorithm description of mpeg-pcc-tm2 (v-pcc)", ISO/IEC JTC1/SC9/WG11 MPEG2018/N17767, Jul. 2018, 22 pages.

Budagavi et al., "[V-PCC] Adaptive selection of occupancy map precision", ISO/IEC JTC1/SC29/WG11 m46132, Jan. 2019, 3 pages.

Najaf-Zadeh et al.,"[V-PCC] [New Proposal] Constrained occupancy map trimming using a ternary occupancy map", ISO/IEC JTC1/SC29/WG11 m47593, Mar. 2019, 5 pages.

* cited by examiner

ADAPTIVE SELECTION OF OCCUPANCY MAP PRECISION

CROSS-REFERENCE TO RELATED APPLICATION AND CLAIM OF PRIORITY

This application claims priority under 35 U.S.C. § 119(e) to U.S. Provisional Patent Application No. 62/790,127 filed on Jan. 9, 2019, U.S. Provisional Patent Application No. 62/815,059 filed on Mar. 7, 2019, U.S. Provisional Patent Application No. 62/823,336 filed on Mar. 25, 2019, and to U.S. Provisional Patent Application No. 62/857,094 filed on Jun. 4, 2019, and U.S. Provisional Patent Application No. 62/938,409 filed on Nov. 21, 2019. The above-identified provisional patent applications are hereby incorporated by reference in its entirety.

TECHNICAL FIELD

The present disclosure relates generally to processing multimedia data. More specifically, this disclosure relates to methods and apparatuses for adaptive selection of occupancy map precision for downsampling and upsampling of occupancy maps during processing of point clouds.

BACKGROUND

A point cloud is a collection of three-dimensional (3D) points with attributes. The attributes can include the geometry coordinates, color, normal, texture coordinates, material properties, motion etc. In a video-based point cloud (V-PCC) approach for processing point clouds, for each input point cloud frame, the geometry and attributes are clustered based on some criteria (e.g., normal direction, distance to projected frames, contiguity, etc.) and projected onto different planes (e.g. xy, yz, zx plane). Each of the clusters shows up as a patch when projected on their respective planes. The patches are sorted and packed into 2D video frame(s) storing the geometry and texture information of the point cloud. Each of the 2D video frames is then encoded with a video codec such as HEVC, AVC, VP9, VP8, JVET, AVC etc. The patches can be irregularly shaped, so a binary occupancy map is used to indicate the pixels in the geometry and texture video that contain valid points. The compressed videos and the compressed occupancy map are multiplexed together with some auxiliary information used for patch creation to make the output bitstream. The output bitstream can be received by a decoder to recreate the point cloud.

SUMMARY

Embodiments of the present disclosure include an encoding device, a method of encoding, and a decoding device for point cloud compression of a 3D point cloud.

In one embodiment, an encoding device is provided. The encoding device includes a communication interface configured to transmit a bitstream, and a processor operably connected to the communication interface which is configured to cause the encoding device to generate, for the three-dimensional (3D) point cloud, at least a set of geometry frames that provides coordinates for points in the 3D point cloud; generate a set of occupancy map frames that indicates whether the points of the 3D point cloud are valid for coding; and select an occupancy precision value based on a quantization parameter (QP) associated with at least one generated geometry frame in the set of geometry frames, wherein the selected occupancy precision value is a first value when the QP is less than a first QP threshold, wherein the selected occupancy precision value is a second value that is higher than the first value when the QP is between the first QP threshold and a second QP threshold, and wherein the selected occupancy precision value is a third value that is higher than the second value when the QP is greater than the second threshold. The processor also causes the encoding device to subsample at least one occupancy map frame in the set of occupancy map frames based on the selected occupancy precision value; encode the set of geometry frames and the set of occupancy map frames into a bitstream; and transmit the bitstream.

In another embodiment, a method for point cloud compression of a 3D point cloud is provided. The method includes generating, for the three-dimensional (3D) point cloud, at least a set of geometry frames that provides coordinates for points in the 3D point cloud; generating a set of occupancy map frames that indicates whether the points of the 3D point cloud are valid for coding; and selecting an occupancy precision value based on a quantization parameter (QP) associated with at least one generated geometry frame in the set of geometry frames, wherein the selected occupancy precision value is a first value when the QP is less than a first QP threshold, wherein the selected occupancy precision value is a second value that is higher than the first value when the QP is between the first QP threshold and a second QP threshold, and wherein the selected occupancy precision value is a third value that is higher than the second value when the QP is greater than the second threshold. Additionally, the method includes subsampling at least one occupancy map frame in the set of occupancy map frames based on the selected occupancy precision value; encoding the set of geometry frames and the set of occupancy map frames into a bitstream; and transmitting the bitstream.

In yet another embodiment, a decoding device for decoding a point cloud compression of a 3D point cloud is provided. The decoding device includes a communication interface configured to receive a bitstream, and a processor operably connected to the communication interface which is configured to cause the decoding device to decode the bitstream into a set of geometry frames that provides coordinates for points in the 3D point cloud; decode the bitstream into a set of occupancy map frames that indicates whether the points of the 3D point cloud are valid for coding; and obtain an occupancy precision value based on a quantization parameter (QP) associated with at least one decoded geometry frame in the set of geometry frames, wherein the identified occupancy precision value is a first value when the QP is less than a first QP threshold, wherein the identified occupancy precision value is a second value that is higher than the first value when the QP is between the first QP threshold and a second QP threshold, and wherein the identified occupancy precision value is a third value that is higher than the second value when the QP is greater than the second threshold. The processor also causes the decoding device to upsample the at least one occupancy map frame in the set of occupancy map frames based on the obtained occupancy precision value; and generate the 3D point cloud using the set of geometry frames and the set of occupancy map frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
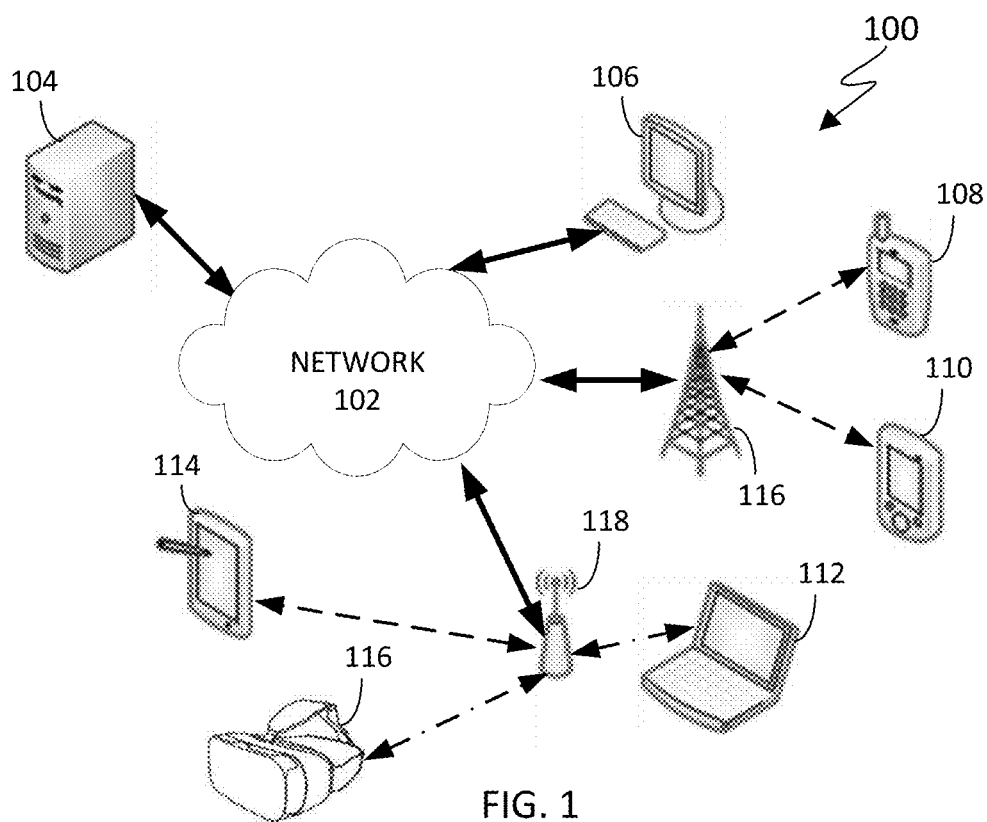
FIG. 1 illustrates an exemplary networked computing system according to various embodiments of this disclosure.

The FIGS. 1-36 included herein, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

Point clouds represent volumetric visual data. Point clouds consist of multiple 3D points positioned in 3D space. Each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In some embodiments, the points are positioned on the external surface of the object. In other embodiments, the points are positioned throughout the internal structure and external surfaces of the object. Additionally, depending upon the application, each point in the point cloud can also include additional attributes such as color (also referred to as texture), reflectance, intensity, surface normal, and the like. In some embodiments, a single point of a 3D point cloud can have multiple attributes. For example, in addition to the geometric position of a point (such as a location of the point in 3D space), each point can include an attribute corresponding to the color of the point, another attribute corresponding to the reflectiveness of the point, as well as additional attributes such as intensity, surface normal, or any combination thereof. In some applications, point clouds can also be used to approximate light field data in which, each point includes multiple view-dependent, color information (R, G, B or Y, U, V triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, a texture corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission Since point clouds contain a large amount of data, they require compression for efficient storage and transmission. To enable the use of existing hardware, a point cloud compression (PCC) codec can operate based on projecting (mapping) 3D coordinates and attributes into 2D video frames (images) which then be compressed using an existing video codec such as HEVC or AVC. In particular, the 3D coordinates can be mapped into a set of geometry frames and the attributes can be mapped into a set of attribute frames.

When the 2D frames are generated, an occupancy map is also generated. As used herein, the term "occupancy map" may be used interchangeable with "occupancy map frame". Generally, the occupancy map indicates, for each pixel within a corresponding 2D frame (e.g., a geometry frame and/or an attribute frame), whether the pixel is a valid pixel or an invalid pixel. For example, if a pixel in occupancy map at coordinate (u, v) is valid, then the corresponding pixel in a geometry frame and the corresponding attribute frame at the coordinate (u, v) are also valid. If the pixel in occupancy map at coordinate (u, v) is invalid, then the decoder skips the corresponding pixel in the geometry and/or texture frames at the coordinate (u, v). In certain embodiments, when the occupancy map is a binary occupancy map, the occupancy value at a position (u, v) can be one or zero. Generally the occupancy map is binary, such that the value of each pixel is either one or zero. In a non-limiting embodiment, when the value of a pixel at position (u, v) of the occupancy map is one indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid.

To reduce the overhead, MPEG V-PCC allows for the occupancy map to be sub-sampled in an encoder by a factor equal to the occupancy precision value before encoding. Occupancy precision value is a sampling factor that determines the number of bits required to code an occupancy map. As used herein, "occupancyPrecision" is a syntax element which may be used interchangeably with "occupancy precision value" or "value of occupancy precision". Lower values of occupancy precision result in occupancy maps with a greater number of bits and higher resolution. Higher values of occupancy precision result in occupancy maps with a fewer number of bits and lower resolution. In the decoder, the occupancy map is upsampled back to original resolution based on the occupancy precision value and used. A default occupancy precision value of 4 is typically used (i.e. the occupancy map is sub-sampled by a factor of 4 in both horizontal and vertical directions). Generally, occupancyPrecision=4 reduces the bitrate but negatively impacts the distortion (quality) since spurious points are introduced into the reconstructed point cloud in the decoder. Likewise, occupancyPrecision=2 will have a higher bitrate than occupancyPrecision=4 but less distortion since less spurious points are introduced on the average.

In the MPEG V-PCC reference software, the value of occupanyPrecision for any point cloud is set externally via user input. Default values for occupancy precision and user-defined values for occupancy precision may be inadequate for certain point cloud compression scenarios. Embodiments of this disclosure recognize the foregoing deficiencies and provide for systems and methods for adaptive selection of occupancy precision values for coding occupancy maps.

FIG. 1 illustrates an exemplary networked computing system according to various embodiments of this disclosure. The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head-mounted display, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder and/or a decoder for processing 3D point clouds.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a head-mounted display 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the head-mounted display 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices can transmit information securely and efficiently to another device, such as, for example, the server 104. Also, any of the client devices 106-116 can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit onto 2D frames, and compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
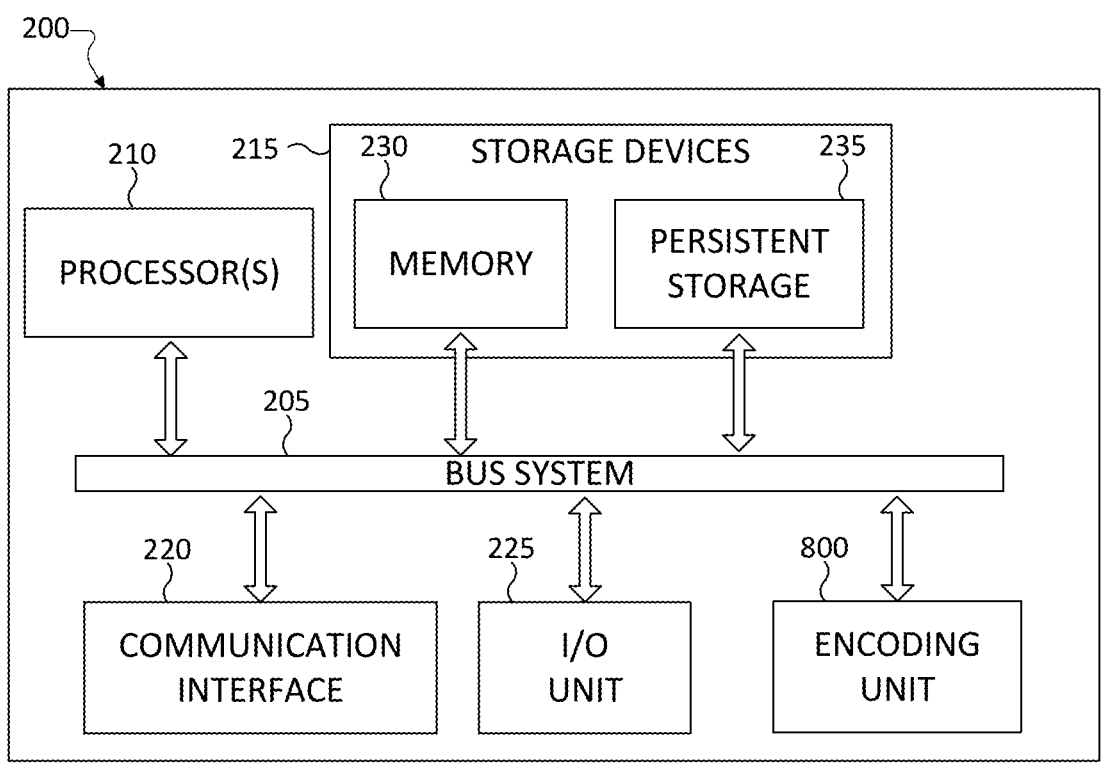
FIG. 2 illustrates an exemplary server according to various embodiments of this disclosure.

FIG. 2 illustrates an exemplary server according to various embodiments of this disclosure. The server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can execute instructions to cause an encoding unit 800 to encode a 3D point cloud stored within the storage devices 215 according to the various embodiments discussed in more detail in the figures that follow. For example, the encoding unit 800 can adaptively select an occupancy precision value based on predetermined criteria to reduce the overhead necessary to transmit encoded bitstream of a 3D point cloud.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, instructions for determining an occupancy precision value for sub sampling a set of occupancy maps, as well as instructions for encoding 2D frames to generate a bitstream. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

Figure 3:
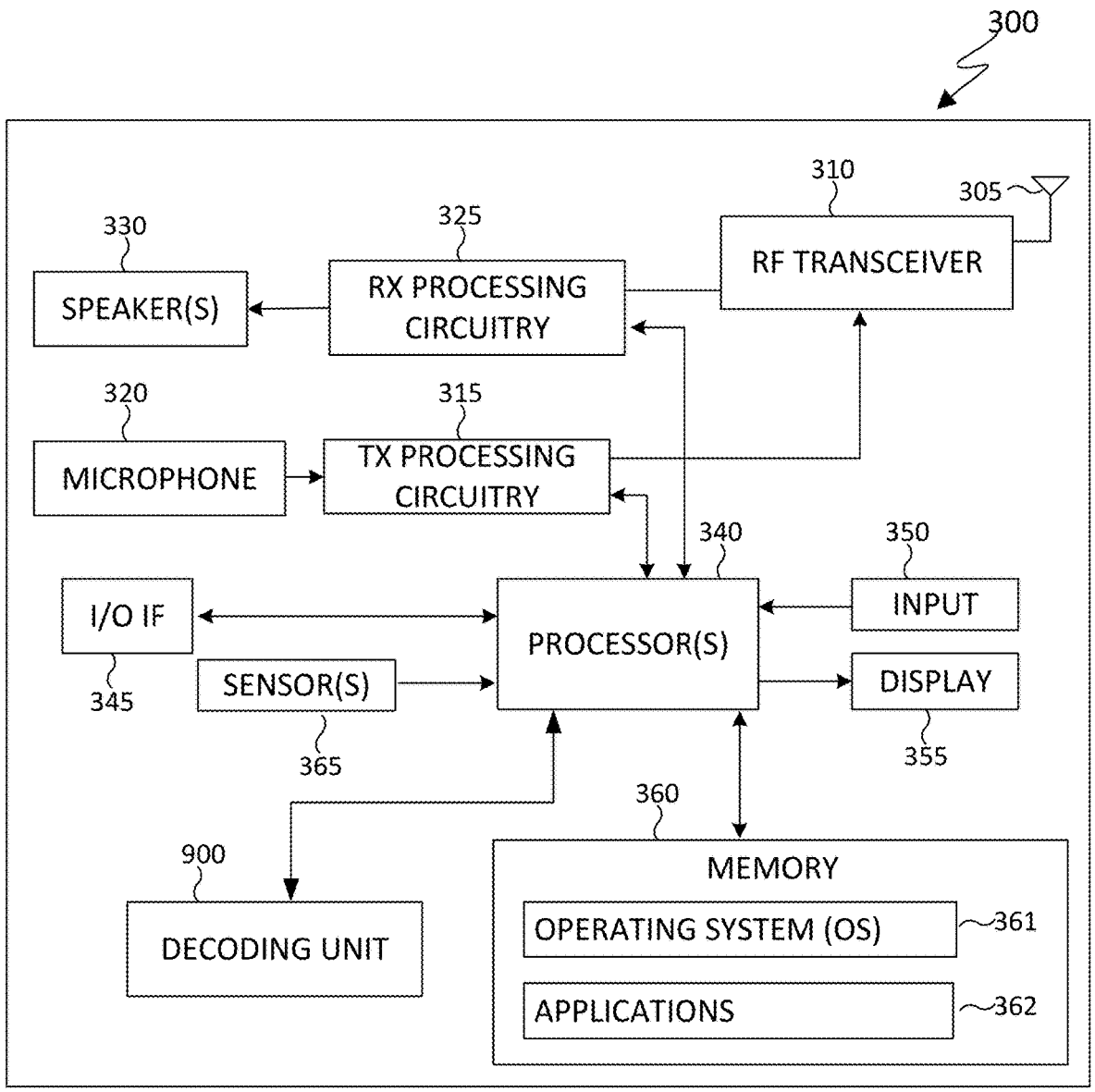
FIG. 3 illustrates an exemplary electronic device according to various embodiments of this disclosure.

FIG. 3 illustrates an exemplary electronic device according to various embodiments of this disclosure. The electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the head-mounted display 116 of FIG. 1), and the like. In certain embodiments, one or more of the client devices 106-116 of FIG. 1 can include the same or similar configuration as the electronic device 300. In certain embodiments, the electronic device 300 can be an encoding device, a decoder device, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Exemplary applications 362 can include an encoder application, a decoder application, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a head-mounted display. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As will be discussed in greater detail below, in some illustrative embodiments, the electronic device 300 can receive an encoded/compressed bitstream. The decoding unit 900 of electronic device 300 can decode/decompress the received bitstream into multiple 2D frames. In certain embodiments, the decoded bitstream also includes an occupancy map that the decoding unit 900 can upsample using a selected occupancy precision value adaptively selected according to the various embodiments disclosed herein.

The multiple 2D frames can include a set of frames that indicates coordinates, such as a geographic location of each point of a point cloud. For example, the frames can include a pictorial depiction, such as one or more patches of each geometric point of the point cloud as represented in 2D. Another set of frames can include texture (i.e., or other attribute) that is associated with each point, such as the color of each point. The decoding unit 900 of electronic device 300 can then reconstruct and render the point cloud in three dimensions.

In some embodiments electronic device 300 can be similar to server 200 and encode a point cloud. The electronic device 300 can generate multiple 2D frames that represent the geometry and texture of the point cloud. The point cloud can be mapped to the one or more 2D frames. For example, one set of frames can include the geometric points as depicted in patches. In another example, another set of frames can include the texture or color or both of the point cloud. In certain embodiments the data representing the point cloud on the 2D frames can be structured, semi-structured, or non-structured.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
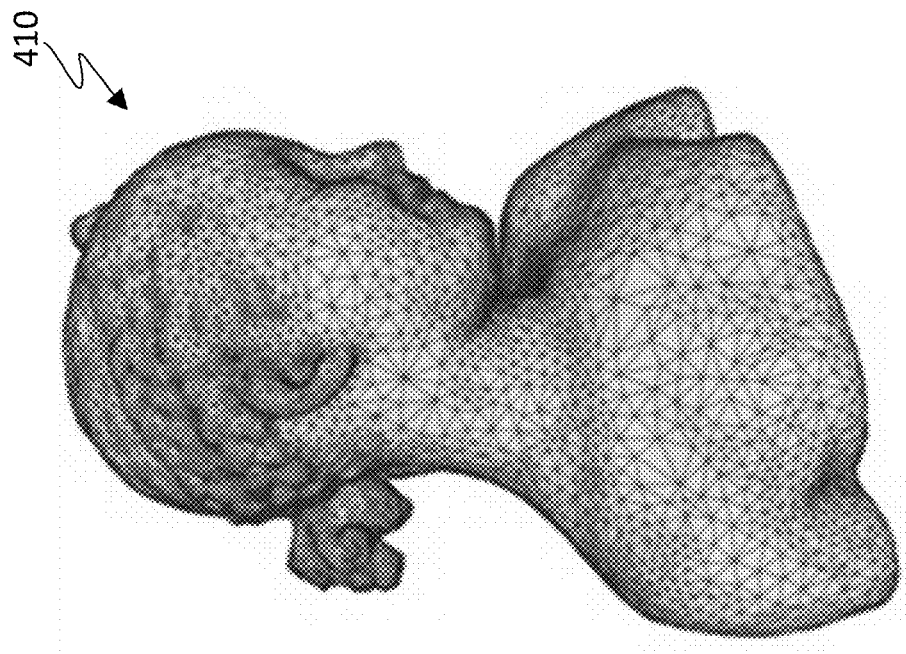
FIG. 4 illustrates a point cloud and an exemplary mesh in accordance with an embodiment of this disclosure.
Figure 4:
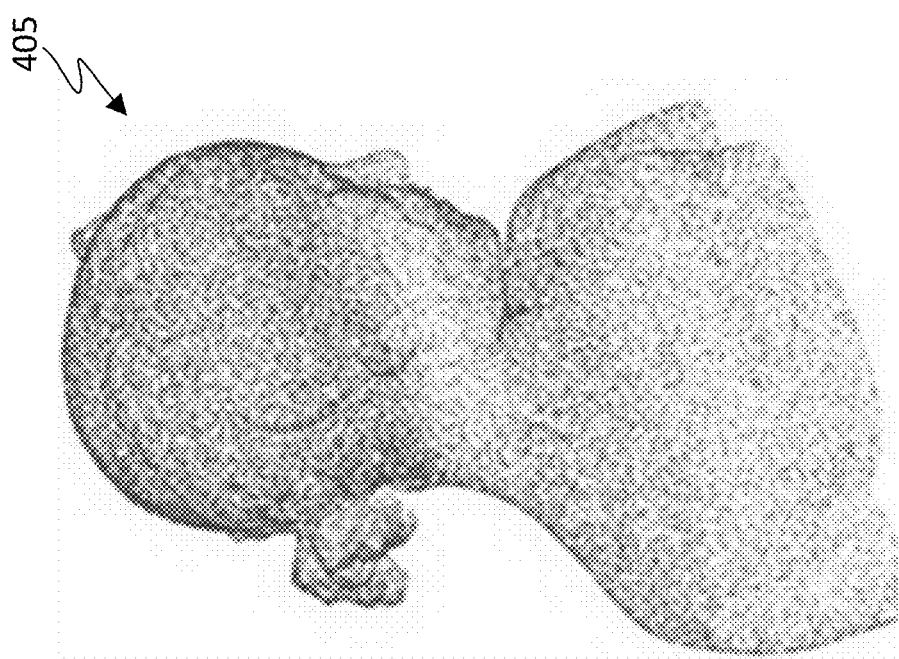

FIG. 4 illustrates a point cloud 405 and an example mesh 410 in accordance with an embodiment of this disclosure. The point cloud 405 depicts an illustration of a point cloud. A point cloud is digitized data that visually defines an object in 3D space. As depicted, the point cloud 405 includes a number of points, each point representing an external coordinate (i.e., a geographical location) of the object, similar to a topographical map. In addition, each point can include one or more attributes such as color, intensity, texture, motion, material properties, and the like.

Similarly, mesh 410 depicts an illustration of a 3D mesh. The mesh 410 is a digitized data that visually defines an object in 3D space. The pictorial depiction of the mesh 410 is defined by many polygonal or triangular interconnectivity of information between the various points. Each polygon can include various information, such as geometric information that defines the geometric location of each vertex in 3D space. In addition, each polygon can include an attribute such as color reflectiveness, motion, and the like. For example, topological data provide connectivity information among vertices such as adjacency of vertices, edges, and faces. Attribute information provides the normal, color, and application dependent information for each individual vertex. The vertices of each polygon are similar to the points in the point cloud 405. Each polygon of the mesh 410 represents the external surface of the object.

Point clouds (such as the point cloud 405) and meshes (such as the mesh 410), utilize substantial bandwidth to transmit from one computing device to another. Compression is necessary to reduce storage and bandwidth requirements. For example, lossy compression can compress a point cloud and mesh while maintaining the distortion within a tolerable level while reducing the size of the data.

FIG. 5 illustrates an exemplary 3D point cloud corresponding 2D frames representing the 3D point cloud according to various embodiments of this disclosure. In particular, FIG. 5A illustrates a 3D point cloud 510. The 3D point cloud 510 is a set of data points in 3D space. Each point of the 3D point cloud 510 includes at least a geometric position and optionally one or more attributes that provide information about each point such as color, reflectiveness, material, and the like.

Figure 5A:
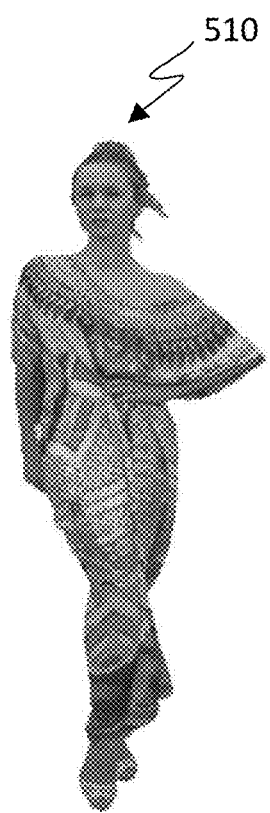
FIGS. 5A-D illustrate an exemplary 3D point cloud and its corresponding 2D frames according to various embodiments of this disclosure.
Figure 5B:
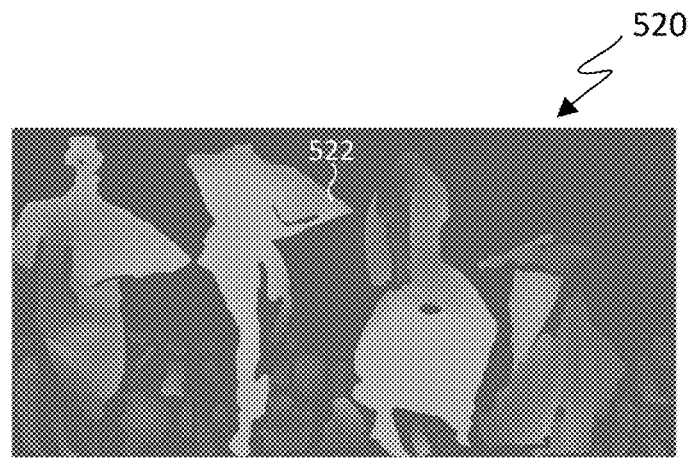
Figure 5C:
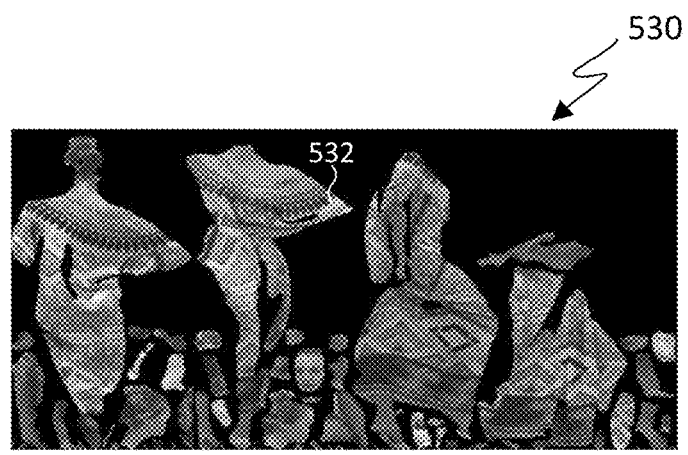
Figure 5D:
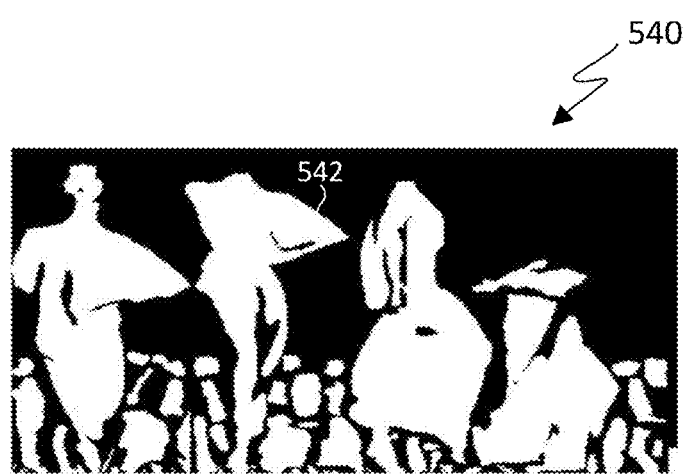

FIGS. 5B, 5C, and 5D each illustrate a 2D frame that includes multiple patches. In particular, FIG. 5B depicts a geometry frame 520, FIG. 5C depicts an attribute frame 530, and FIG. 5D depicts an occupancy map frame 540. Geometry frame 520 includes information that represents the geometric position of points of the 3D point cloud 510. In this illustrative example, the attribute frame 530 includes information that represents at least the color associated with points of the 3D point cloud 510. Other attributes can also be represented in attribute frame 530. Occupancy map frame 540 includes information that indicates whether the pixels included in the geometry frame(s) and/or attribute frame(s), at respective positions in the occupancy map frame(s) represent the points of the 3D point cloud. Restated, the occupancy map frame(s) indicate whether the points of the 3D point cloud in the set of geometry frame(s) and the attribute frame(s) are valid for coding.

The geometry frame 520 includes multiple patches (such as a patch 522) representing the depth values of the 3D point cloud 510. The attribute frame 530 includes multiple patches (such as a patch 532) representing an attribute, such as color of the 3D point cloud 510. Each pixel of color in the attribute frame 530 corresponds to a particular geometry pixel in the geometry frame 520. A mapping can be generated between each pixel in the geometry frame 520 and the attribute frame 530.

Patches in the occupancy map frame 540 identifies which points of the point cloud 510 are valid for encoding. For example, black pixels are invalid and white pixels are valid. For lossless compression, the patches in occupancy map frame 540 correspond directly with the analogous patches in the geometry frame 520 and attribute frame 530. However, in some embodiments disclosed herein provide for lossy compression in which case the patches in the occupancy map frame 540 differs slightly from the patches in the geometry frame 520 and attribute frame 530 and exclude pixels from the encoding/decoding process.

Figure 6:
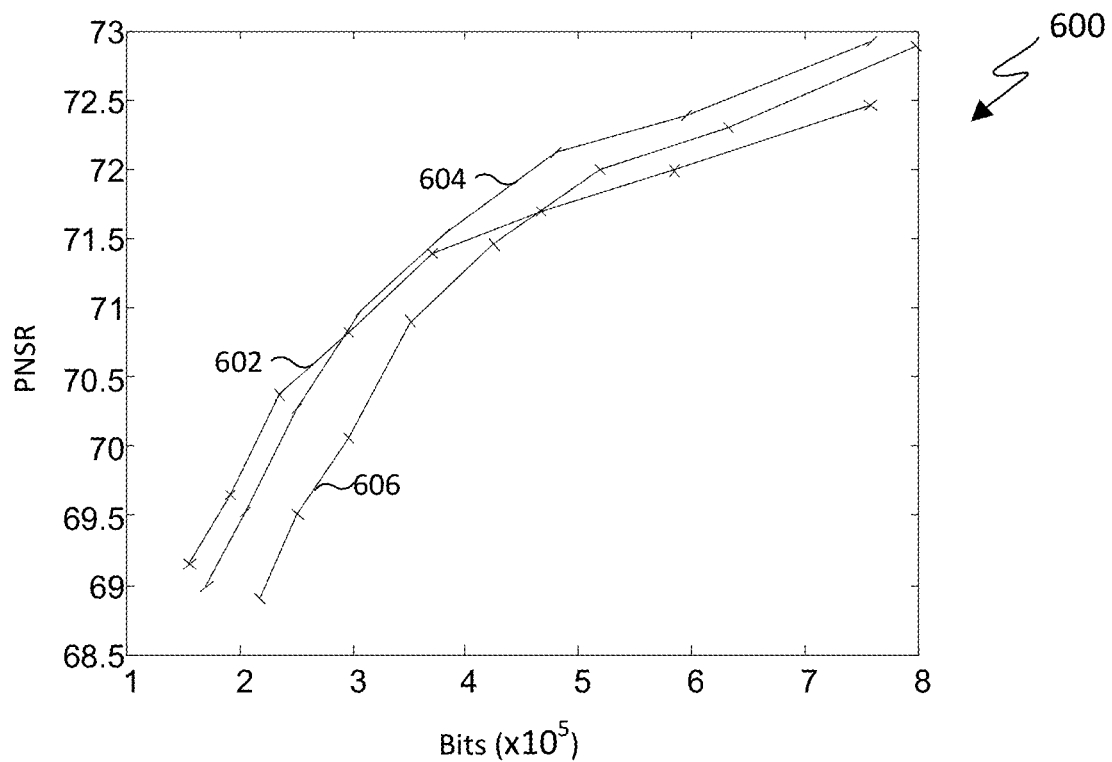
FIG. 6 illustrates distortion rate curves for various occupancy precision values according to various embodiments of this disclosure.

FIG. 6 illustrates distortion rate curves for various occupancy precision values according to various embodiments of this disclosure. In particular, graph 600 shows distortion rate curves over different bitrates that are controlled by QP values. The y-axis of graph 600 is peak-signal-to-noise-ratio and is a measure of quality. The x-axis of graph 600 is bitrate. Curve 602 is for occupancyPrecision=4. Curve 604 is for occupancyPrecision=2. Curve 606 is for occupancyPrecision=1. Graph 600 shows that, when the combined distortion-rate performance is considered, occupancyPrecision=4 performs better than occupancyPrecision=2 at lower bitrates where as occupancyPrecision=1 and 2 performs better at higher bitrates.

At the decoder, a subsampled occupancy map is upsampled back up to the original resolution leading to invalid pixels (i.e. points not in original point cloud) which may be filtered out using geometry smoothing filter for achieving good reconstruction quality. The proportion of invalid pixels is higher when occupancy precision value=4 as compared to when occupancy precision value=2 as shown in a comparison of Table 1 and Table 2, which depicts valid and invalid pixels of a 3D point cloud frame for various objects after downsampling and upsampling. So it is desirable to use lower value of occupancy precision to obtain better reconstruction quality.

TABLE 1

Occupancy Precision Value = 2.

| Object | No. Valid Pixels | No. Invalid Pixels | Ratio |
| --- | --- | --- | --- |
| Loot | 560283 | 14033 | 2.50% |
| redAndBlack | 500502 | 20790 | 4.15% |
| Soldier | 726181 | 24659 | 3.40% |
| Queen | 575820 | 25728 | 4.47% |
| longDress | 534978 | 13366 | 2.50% |
| Basketball | 2000571 | 30821 | 1.50% |
| dancer | 1767959 | 32809 | 1.86% |

TABLE 2

Occupancy Precision Value = 4.

| Object | No. Valid Pixels | No. Invalid Pixels | Ratio |
| --- | --- | --- | --- |
| Loot | 560283 | 40453 | 7.22% |
| redAndBlack | 500502 | 57882 | 11.56% |
| Soldier | 726181 | 71595 | 9.86% |
| Queen | 575820 | 63492 | 11.03% |
| longDress | 534978 | 37982 | 7.10% |
| Basketball | 200571 | 89061 | 4.45% |
| dancer | 1767959 | 96617 | 5.46% |

It may be desirable to use a lower value of occupancy precision to reduce the number of invalid pixel and improve quality. However, the bits required to code occupancy map goes up as occupancy precision value goes down and shown in Table 3.

TABLE 3

Bits Required for Coding Occupancy Maps.

| | Occupancy Precision Value = 4 | Occupancy Precision Value = 2 | Occupancy Precision Value = 1 |
|---|---|---|---|
| Loot | 21648 | 40592 | 87992 |
| redAndBlack | 31608 | 58664 | 125104 |
| Soldier | 40528 | 73648 | 155336 |
| Queen | 31672 | 58464 | 143000 |
| longDress | 19760 | 36560 | 76384 |
| Basketball | 43456 | 84864 | 183832 |
| Dancer | 46632 | 92520 | 19979 |

Figure 7:
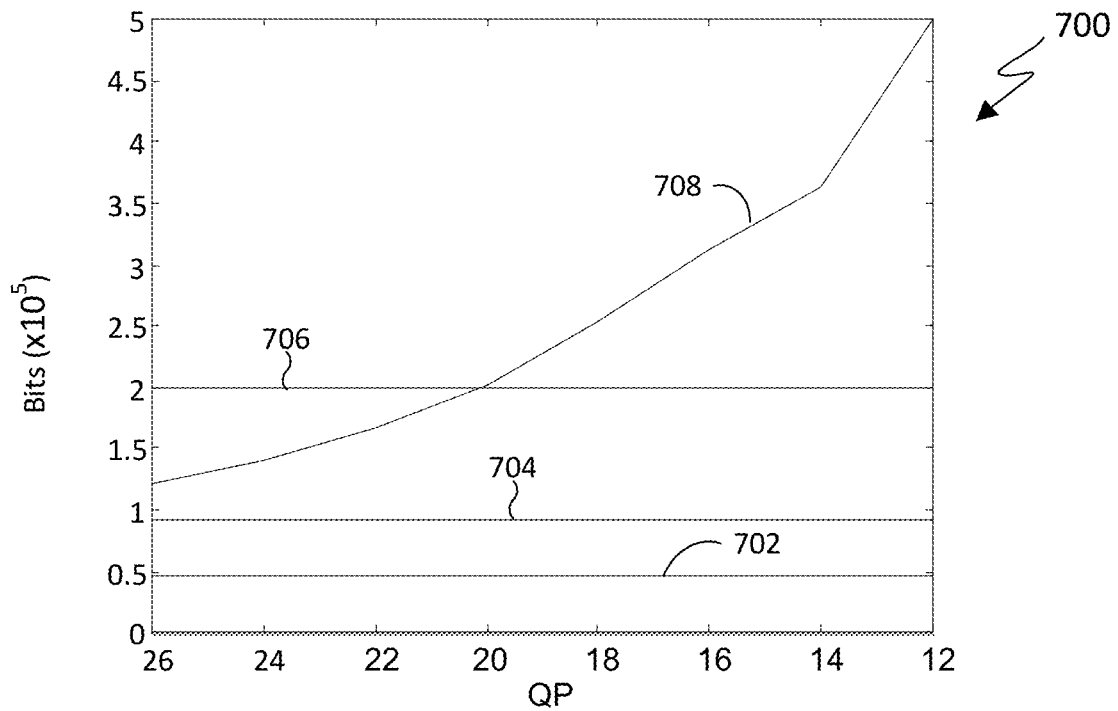
FIG. 7 illustrates comparative bit curves for coding occupancy map frames and geometry frames according to various embodiments of this disclosure.

FIG. 7 illustrates comparative bit curves for coding occupancy map frames and geometry frames according to various embodiments of this disclosure. When occupancy map is coded losslessly, the bits needed to code occupancy map remain the same independent of the bitrate. Curve 702 is for occupancyPrecision=4. Curve 704 is for occupancyPrecision=2. Curve 706 is for occupancyPrecision=1. Curve 708 is for a representative geometry frame.

As can be seen in graph 700, a smaller occupancy precision value provides better quality at the cost of increased bitrate for coding occupancy map. Bits for occupancy map can be a significant portion of total bits for coding geometry (occupancy map bits+geometry video bits). There is a trade-off between increased bits vs improved quality.

In addition to the improvement to rate-distortion performance, the disclosed methods will improve the visual quality of the reconstructed point cloud at high bitrates. Since smaller values for occupancy precision will lead to a smaller number of spurious points, even without smoothing the geometry, the visual quality of the reconstructed point cloud will improve. Adaptive selection of occupancy precision values can be used to balance the quality of a reconstructed 3D point cloud and its corresponding bitrate.

Figure 8:
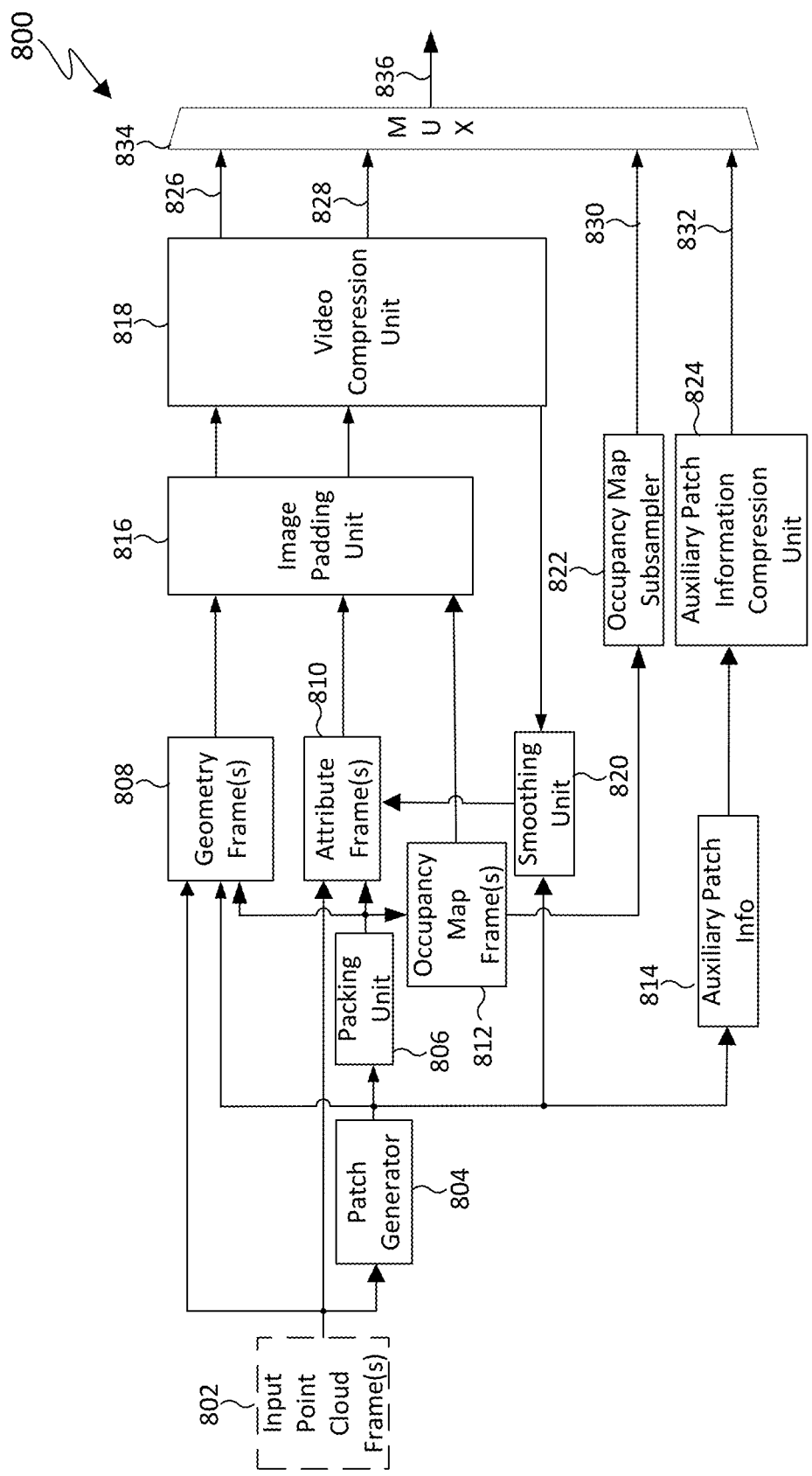
FIG. 8 illustrates an exemplary encoding unit according to various embodiments of this disclosure.

FIG. 8 illustrates an exemplary encoding unit according to various embodiments of this disclosure. The encoder 800 can be incorporated into a server, such as server 200 in FIG. 2, or in one or more electronic devices, such as electronic device 300 in FIG. 3. The encoder 800 illustrates a high-level overview of an embodiment of the present disclosure of an electronic device that encodes and compresses a point cloud for transmission. In certain embodiments, the encoder 800 packages a point cloud for transmission by a bitstream to one or more decoders, such as decoder 900 in FIG. 9.

Generally, the encoder 800 can compress, encode, and transmit a point cloud, a mesh, or both, as an encoded bitstream. In certain embodiments, the encoder 800 generates multiple 2D frames, such as geometry frame 520 and attribute frame 530 in FIGS. 5B and 5C, respectively, in which a point cloud or a mesh is mapped or projected onto. In certain embodiments, the encoder 800 generates an occupancy map (such as the occupancy map 540 in FIG. 5D) that indicates where each pixel of the point cloud is located when the point cloud is mapped onto the 2D frame. For example, the occupancy map indicates valid points and invalid points of each frame. The invalid points are locations of the frame that does not correspond to a point of the point cloud, whereas a valid point is a location of the frame that corresponds to a point in the 3D point cloud. In certain embodiments, encoder 800 is a web server, a server computer such as a management server, or any other electronic computing system capable of, mapping the three dimensions of a point cloud into two dimensions, compressing frames, and encoding images for transmission. In certain embodiments, the encoder 800 can be a "cloud" of computers interconnected by one or more networks, where each is a computing system utilizing clustered computers and components to act as a single pool of seamless resources when accessed through network 102 of FIG. 1.

The encoder 800 is configured to receive input point cloud frame(s) 802 that represents a point cloud, such as point cloud 510 in FIG. 5A. The point cloud can be stored in memory that is associated with the encoder 800, such as storage devices 230 in FIG. 2. The patch generator 804 decomposes the point cloud frame(s) 802 into multiple patches. The patches can be organized based on geometry and attribute(s). Geometry is the geographic location of each point of the point cloud and attribute(s) represent various aspects of each point of the point cloud, such as color, intensity, normal, reflection, and the like. The patch generator 804 clusters geometry attributes and texture attributes. The clustering can be based on criteria such as a normal direction, distance to projected frames, contiguity, and the like. Each generated cluster is represented as a patch, as described above in FIG. 5.

In certain embodiments, the patch generator 804 projects and maps the points of the point cloud onto 2D frames via a one-to-one mapping. In certain embodiments, the patch generator 804 projects and maps the points of the point onto 2D frames (e.g., geometry frame(s) 808 and attribute frame(s) 810) via projecting the points onto different planes. In certain embodiments, projecting and mapping the points of a point cloud onto 2D frames can be based on a raster scan mapping, mapping based on the X geometric coordinate, mapping based on the Y geometric coordinate, mapping based on the Z geometric coordinate, mapping based on color, mapping based on normal direction, and the like.

In certain embodiments, the after projecting and mapping the points of the point cloud onto a 2D frame, the points can be sorted and packed in the 2D frame to increase coding efficiency. The packing unit 612 sorts and packs the points within a patch. The packing unit 806 also sorts and packs the patches into the one or more geometry frames 808 and the one or more attribute frames 810. In certain embodiments, the packing unit 806 creates the one or more geometry frames 808 and the one or more attribute frames 810.

In some embodiments, the packing unit 806 can create the occupancy map 812. The occupancy map indicates the pixel location in the frames (such as the one or more geometry frames 808 and the one or more attribute frames 810) that contain valid points of the point cloud that are projected or mapped onto the respective frames. For example, the occupancy map 812 indicates whether each pixel on each frame (such as the one or more geometry frames 808 and the one or more attribute frames 810) is a valid pixel or blank. A valid pixel on the occupancy map indicates a pixel on the 2D frame that corresponds to a 3D point in the point cloud. In certain embodiments, the occupancy map 812 can be the same for each frame, such as the one or more geometry frames 808 and the one or more attribute frames 810. In certain embodiments, the occupancy map 812 represents multiple occupancy maps, where each occupancy map corresponds to one frame (such as the one or more geometry frames 808 and the one or more attribute frames 810). The occupancy map 812 can be included in another frame, similar to that of the one or more geometry frames 808 or the one or more attribute frames 810. In certain embodiments, the occupancy map 812 can be transmitted as metadata as a separate bitstream.

The patch generator 804 also generates the auxiliary patch-information 814. The auxiliary patch-information 814 is information that is associated with each generated patch. In certain embodiments, the auxiliary patch-information 814 is metadata about the patches. For example, every patch has associated with it, auxiliary information such as (i) spatial position offsets, (ii) depth offset, (iii) location of patch in the video frame, (iv) size of the patch (such as the height and width of the patch), (v) index of projection plane, and the like. The auxiliary patch-information 814 is used by the decoder, such as the decoder 900 in FIG. 9, to reconstruct the point cloud. To reduce overhead, the auxiliary patch-information 814 may be compressed by an auxiliary patch information compression unit 824 prior to transmission The 2D frames, e.g., geometry frame(s) 808, attribute frame(s) 810, and occupancy map frame(s), can be sent to an image padding unit 816 to fill the unfilled area between the projected patches using an image padding algorithm to reduce the number of sharp edges in the projected video frames, which reduces the compression bitrate.

The one or more geometry frames 808 are compressed by compression unit 818 using a conventional 2D codec, such as high-efficiency video coding (HEVC) or advanced video coding (AVC). To encode attribute frames that include a color attribute, the set of geometry frames is first decoded to reconstruct the 3D coordinates. Then the reconstructed geometry coordinates are smoothed out using smoothing unit 820, and their color values are interpolated from the color values of input coordinates. The generated colors are then packed into a set of attribute frames 810.

To reduce overhead, the set of occupancy map frames 812 are subsampled by occupancy map subsampler 822 using methods described in the various embodiments that follow. The subsampled set of occupancy map frame(s) may also be referred to in the alternative as low-resolution occupancy map frame(s).

Figure 9:
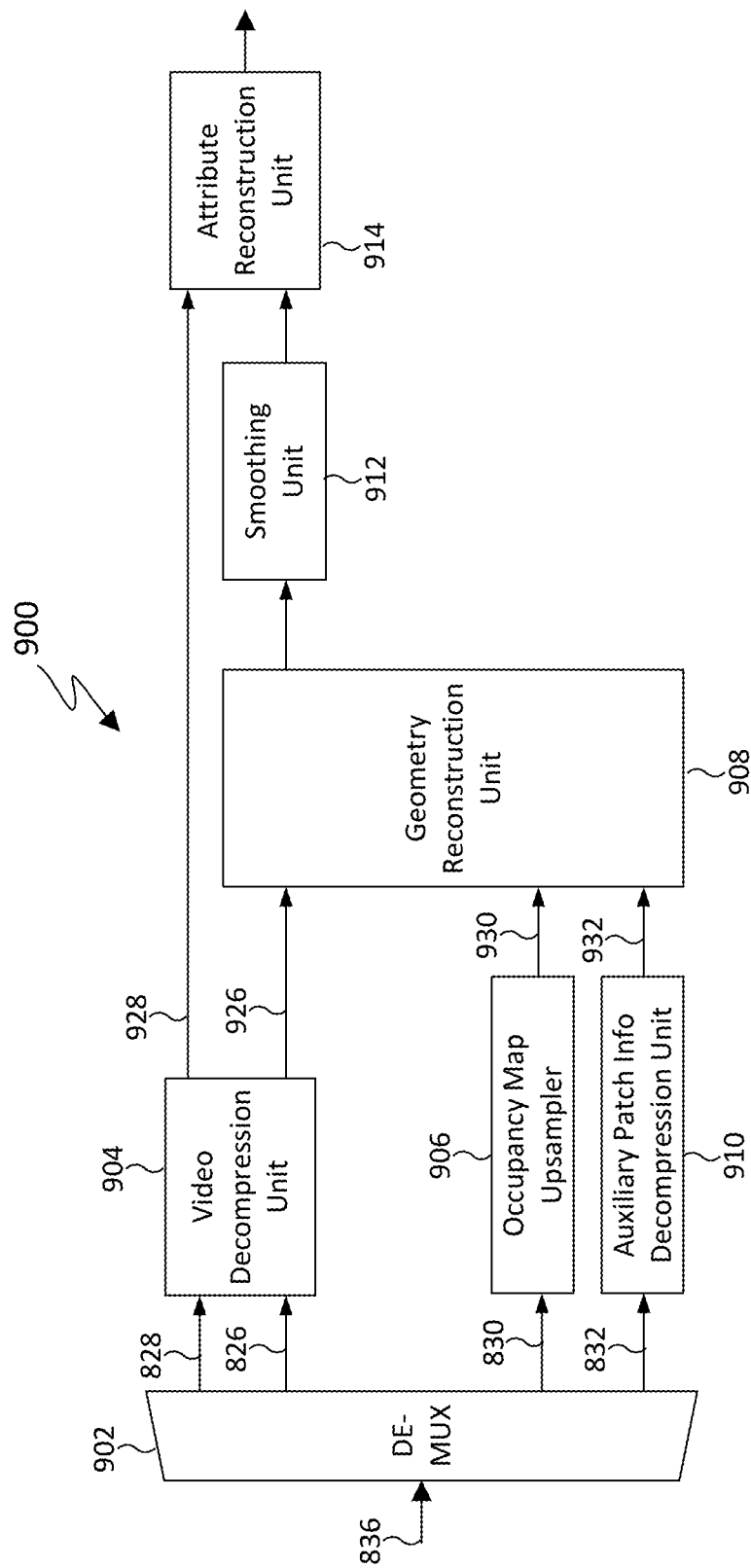
FIG. 9 illustrates an exemplary decoding unit according to various embodiments of this disclosure.

The subsampled set of occupancy map frames 830, the compressed geometry frame(s) 826, the compressed attribute frame(s) 828, and the compressed auxiliary patch-information 832 can be multiplexed via multiplexer 834 to create a single bitstream 836 that can be transmitted to a decoder, such as decoder 900 in FIG. 9.

FIG. 9 illustrates an exemplary decoding unit according to various embodiments of this disclosure. The decoding unit 900 can be incorporated into an electronic device, such as electronic device 300 in FIG. 3, or in one or more servers, such as server 200 in FIG. 2.

The decoding unit 900 is configured to decode/decompress an encoded bitstream, such as encoded bitstream 836 that includes a representation of a point cloud, a mesh, or both. In certain embodiments, the decoding unit 900 generates multiple point clouds from a received bitstream that includes multiple 2D frames. For example, each of the points of the point cloud can be mapped based on the information received in the 2D frames and a received occupancy map.

Upon receiving the encoded bitstream 836, the demultiplexer 902 separates the encoded bitstream 836 into compressed geometry frame(s) 826, compressed attribute frame(s) 828, low-resolution occupancy map frame(s) 830, and compressed auxiliary patch-information 832.

The compressed geometry frame(s) 826 and the compressed attribute frame(s) 828 are decompressed by the video decompression unit 904 to generate 2D video frames for geometry 926 and color 928, respectively. The compressed auxiliary patch information 832 is decompressed by the auxiliary path decompression unit 910 to form decompressed auxiliary patch information 932. As used herein, decompressing can be used interchangeably with decoding.

The set of low-resolution occupancy map frame(s) 830 is upsampled by an occupancy map upsampler 906 to form upsampled occupancy map frames 930 that can be passed along with the decompressed auxiliary patch information 932 on to a geometry reconstruction unit 908. The set of upsampled occupancy map frame(s) 930 indicates the valid pixel location within the 2D frames to reconstruct the 3D point cloud.

The geometry reconstruction unit 908, reconstructs geometry frame data based on the data received from the demultiplexer 902 and/or video decompression unit 904. The locations and dimensions of the regular patches are retrieved from the decompressed auxiliary patch information unit 910. For example, the points are reconstructed from the regular patches by adding the patch offsets (from decompressed auxiliary patch information 932) to the spatial location of the points in the video and adding depth offset of the patch to the value of the pixel at the spatial location.

The geometry reconstruction unit 908 can send reconstructed geometry frame data to a smoothing unit 912, and then to the attribute reconstruction unit for combination with the information in the decompressed attribute frame(s) 928 to recreate the 3D point cloud.

Figure 10:
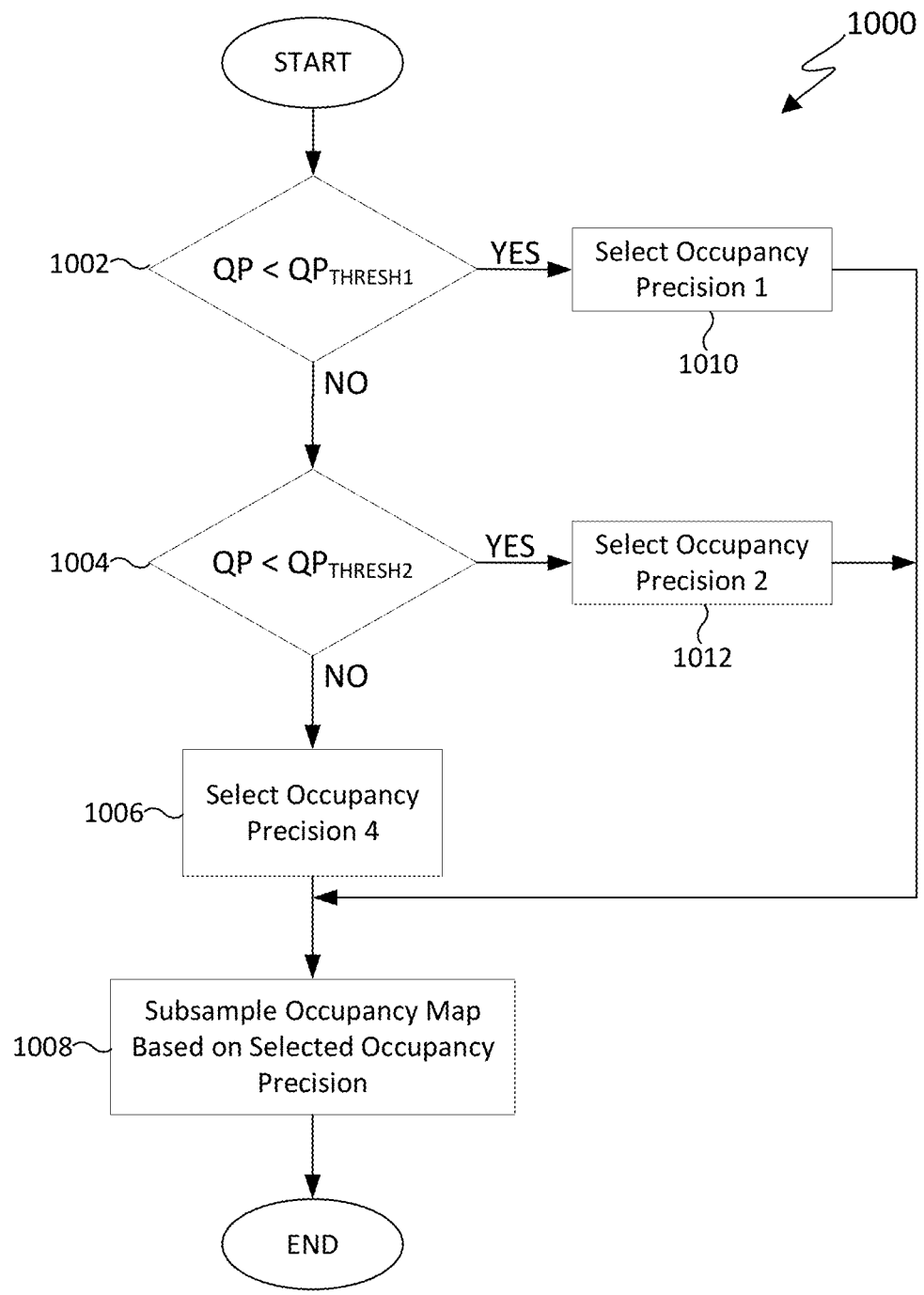
FIG. 10 illustrates a flowchart of a process for adaptive selection of occupancy precision values according to various embodiments of this disclosure.

FIG. 10 illustrates a flowchart of a process for adaptive selection of occupancy map precision according to various embodiments of this disclosure. Operations described in flowchart 1000 can be implemented in an encoder, such as encoder 800 in FIG. 8. The encoder can be included in a server, such as server 200 in FIG. 2 or an electronic device, such as electronic device 300 in FIG. 3.

In one embodiment of this invention, the occupancyPrecision is automatically selected based on the quantization parameter used for quantizing the geometry video frame(s). Flowchart 1000 begins at operation 1002 by making a determination as to whether QP is less than $QP_{THRESH1}$. If QP is not less than $QP_{THRESH1}$, then another determination is made in operation 1004 as to whether QP is less than $QP_{THRESH2}$. If QP is not less than $QP_{THRESH2}$, then an occupancyPrecision of 4 is selected in operation 1006. The occupancy map frame is subsampled based on the selected occupancyPrecision in operation 1008 and the process terminates.

Returning back to operation 1002, if QP is less than $QP_{THRESH1}$, then an occupancyPrecision of 1 is selected in operation 1010 and the flowchart proceeds to operation 1008 where the occupancy map frame is subsampled based on the selected occupancyPrecision before the process terminates.

At operation 1004, if QP is less than $QP_{THRESH2}$, then an occupancyPrecision of 2 is selected in operation 1012 and the flowchart proceeds to operation 1008 where the occupancy map frame is subsampled based on the selected occupancyPrecision before the process terminates.

Figure 11:
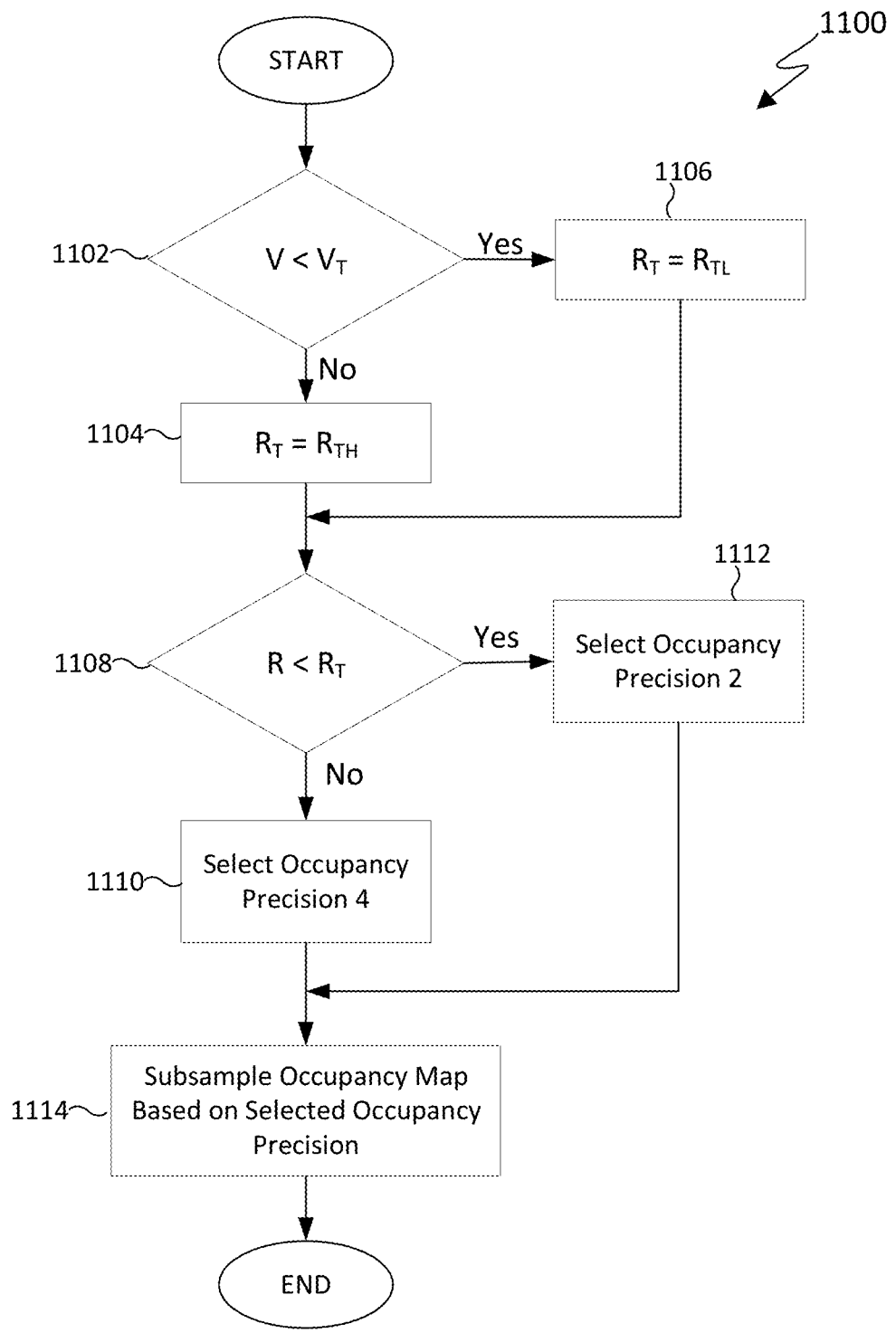
FIG. 11 illustrates a flowchart of another process for adaptive selection of occupancy precision values according to various embodiments of this disclosure.

FIG. 11 illustrates a flowchart of another process for selecting a variable occupancy precision value according to various embodiments of this disclosure. Flowchart 1100 can be implemented in an encoder such encoder 800 in FIG. 8. The encoder can be included in a server, such as server 200 in FIG. 2 or an electronic device, such as electronic device 300 in FIG. 3.

In the process according to this embodiment, the following variables are defined:

$B_o$=Bits for occupancy map frame;
$B_g$=Bits for geometry frame;
$R=B_o/B_g$;
$R_T$=Threshold for Ratio R;
$R_{TL}$, =Low Threshold for Ratio R;
$R_{TH}$=High Threshold for Ratio R;
V=Percent invalid pixels at occupancyPrecision=4; and
$V_T$=Threshold for percent invalid pixels.

V determines the quality of geometry at occupancyPrecision=4. V can be compared to a pre-defined threshold $V_T$ to determine the ratio threshold $R_T$. If the value of V is low then it is better to use higher values of occupancy precision since the penalty of rate increase by going to lower values for occupancy precision will not offset the improvement in quality. So the ratio threshold $R_T$ is adaptively selected based on V. If V is low, the bar ($R_{TH}$) is higher to switch to lower occupancy precision. If V is high, then the bar ($R_{TL}$) is lower to switch to lower occupancy precision.

In one embodiment, ratio R is compared with $R_T$ to determine occupancy precision. Lower values of occupancy precision are used when $B_g$ are significantly greater than $B_0$. This logic is used since there is trade-off between rate and distortion, using too many bits for occupancy map by using a lower value of occupancy precision might not offset improvement in geometry quality. The final occupancy map is obtained by sub sampling the input occupancy map by a factor of occupancyPrecision.

Returning to FIG. 11, flowchart 1100 begins at operation 1102 by making a determination as to whether V is less than $V_T$. If V is less than $V_T$, then in operation 1104 $R_T$ is set to $R_{TH}$. However, if V is not less than $V_T$, then $R_T$ is set to $R_{TL}$ in operation 1106.

In operation 1108, a determination is made as to whether R is less than $R_T$. If R is not less than $R_T$, then an occupancyPrecision of 4 is selected in operation 1110. Otherwise, if R is less than $R_T$, then an occupancyPrecision of 2 is selected in operation 1112. In operation 1114, the occupancy map is subsampled using the selected occupancyPrecision. The process terminates thereafter.

In one or more variations of the embodiments disclosed herein, multiple thresholds can be used to decide on other occupancy precision values; the occupancyPrecision can be automatically selected based on the quantization parameter used for quantizing the geometry, texture, and auxiliary video; the occupancyPrecision can be automatically selected based on the bits consumed by the geometry, texture and occupancy map; the occupancyPrecision can be automatically selected based the number of patches; the occupancyPrecision can be automatically selected based the number of patch boundary pixels; and the occupancyPrecision can be selected based on the number of invalid pixels created after upsampling the low-resolution occupancy map in the decoder.

FIG. 12 illustrates occupancy maps processed using sub-block indicators according to various embodiments of this disclosure. This embodiment will use larger values for occupancyPrecision for interior blocks of occupancy map to improve coding efficiency while using smaller values for occupancyPrecision for exterior blocks. Since smaller values for occupancyPrecision for exterior blocks will be used, there would be almost no need for geometry smoothing. This leads to significant reduction in complexity and memory usage in the decoder.

In the illustrative example in FIG. 12, occupancyPrecision is set to a higher value, such as 2 or 4 but a smaller value for occupancyPrecision (e.g., 2 or 1) can be used for partially filled 4×4 blocks near the patch boundary. The occupancy value for the sub-blocks of 2×2 pixels are added to the low-resolution occupancy map and used at the decoder to trim the occupancy map near patch borders. The order of the exterior blocks will also be signaled to the decoder to determine the corresponding subblock occupancy values. Alternatively, instead of extending the low-resolution occupancy map as in FIG. 12, the subblock occupancy values can be signaled to the decoder using an SEI message or other mechanism.

Figure 12A:
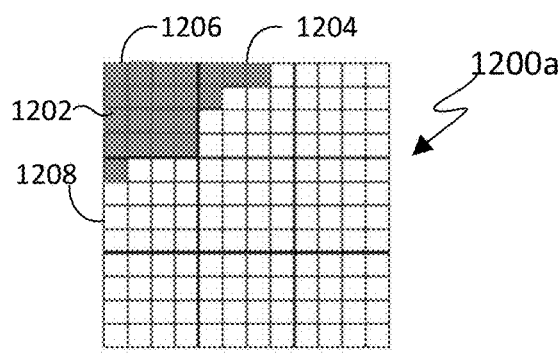
FIGS. 12A-C illustrate occupancy maps processed using subblock indicators according to various embodiments of this disclosure.
Figure 12B:
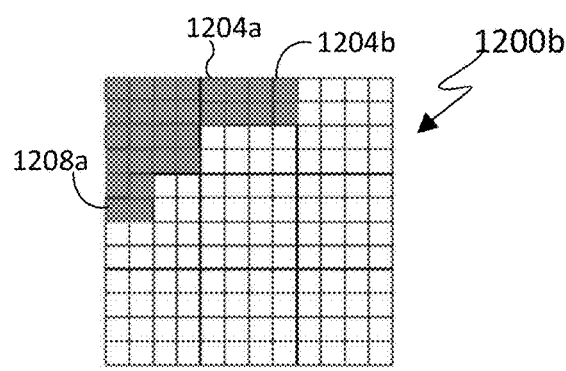

FIG. 12A depicts an occupancy map 1200a with a patch 1202 having 4×4 boundary blocks 1204, 1206, and 1208. Boundary blocks 1204 and 1208 are partially filled boundary blocks and boundary block 1206 is a completely filled boundary block. FIG. 12B depicts an occupancy map 1200b that can be obtained by downsampling then upsampling the occupancy map 1200a with occupancyPrecision 2. However, according to this embodiment, an encoder can create an occupancy map frame that includes occupancy map 1200b using a high occupancy precision value (such as 4) for interior blocks and a lower occupancy precision value for exterior blocks. This occupancy map frame can be encoded using standards compliant video encoder such as HEVC/AVC etc. Then, the exterior 4×4 blocks in the occupancy map are identified (e.g., blocks 1204, 1206, and 1208). One method to this would be if any of the neighboring 4×4 blocks (above, below, left or right) is unoccupied, the current 4×4 block is classified as an exterior block. Then for each exterior 4×4 block, the occupancy information for each 2×2 subblock, e.g., subblocks 1204a, 1204b, and 1208a, can be coded as side information in the patch frame bitstream or alternatively as SEI message. The exterior 4×4 blocks are scanned in a pre-determined order (e.g. raster scan) known to the decoder. This process may be continued for another level where exterior 2×2 blocks are determined and for each exterior 2×2 block, the occupancy information for each pixel position is sent. Alternatively, the initial occupancy map video may be created with occupancy precision value of 2.

Figure 12C:
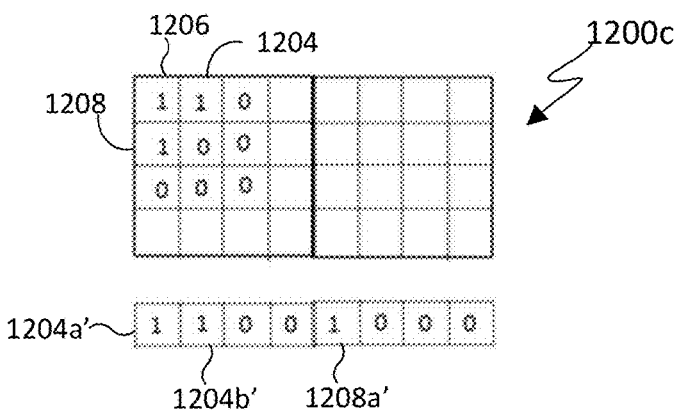

FIG. 12C is a downsampled occupancy map 1200c at occupancyPrecision 4, with blocks having values of 1 if the corresponding block in the original occupancy map included a valid pixel, or 0 if the corresponding block in the original occupancy map did not include a valid pixel. For example, blocks 1204, 1206, and 1208 in occupancy map 1200c include a 1 because blocks 1204, 1206, and 1208 in occupancy map 1200a included valid pixels. The downsampled occupancy map 1200c also includes subblock indicators 1204a', 1204b', and 1208a' appended at the end that correspond to a 2×2 subblock in FIG. 12B. Thus, the downsampled occupancy map 1200c can be used by a decoder to create upsampled occupancy map 1200b with interior blocks or completely filled exterior blocks with an occupancy precision value of 4, and partially filled exterior blocks with an occupancy precision value of 2.

At the decoder, the standards compliant low-resolution occupancy map bitstream (e.g. occupancy precision value of 4) is decoded. Based on the decoded 2D occupancy map frame, the exterior blocks (4×4 in this case) are determined as in the encoder. Finally, for each exterior block, the subblock occupancy map (2×2 in this case) is parsed from the bitstream (patch frame bitstream or SEI message) to determine occupancy information for pixels belonging to the exterior 4×4 blocks. This process may be repeated to identify exterior 2×2 blocks and decode the pixel level (1×1 level) occupancy map for each exterior block. The corresponding flowchart is described in more detail in FIG. 13.

Figure 13:
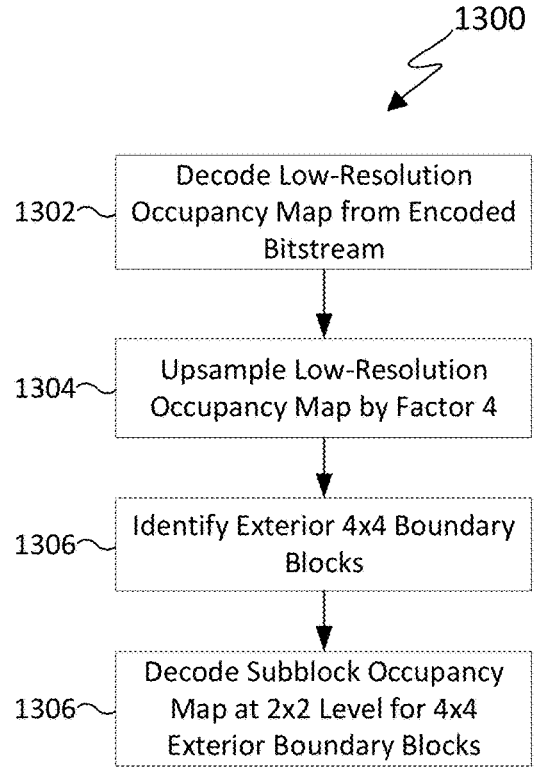
FIG. 13 illustrates a flowchart for generating an upsampled occupancy map using a subblock indicator according to various embodiments of this disclosure.

FIG. 13 illustrates a flowchart for generating an upsampled occupancy map using a subblock indicator according to various embodiments of this disclosure. Operations described in flowchart 1300 can be implemented in a decoder such as decoding unit 900 in FIG. 9. The decoding unit can be included in an electronic device, such as electronic device 300 in FIG. 3 or in a server, such as server 200 in FIG. 2.

Flowchart 1300 begins at operation 1302 by decoding a low-resolution occupancy map from an encoded bitstream. In operation 1304, the low-resolution occupancy map is upsampled by a factor of 4. Exterior 4×4 boundary blocks are identified in operation 1306 and the subblock occupancy map is decoded at a 2×2 level for each of the exterior 4×4 boundary blocks.

In V-PCC, the occupancy map may be coded using a standards-based video coder such as HEVC or AVC. Some of the newer standards such as versatile video coding (VVC) and alliance for open media codec (AV-1), support frames with different resolutions in the same video sequence. This feature may be exploited in conjunction with the alternative embodiments described above.

For example, the alternative embodiments described above may be used to determine the appropriate occupancyPrecision for each frame. Then, the occupancy map frame at an appropriate resolution may be generated by the encoder. For example, if the optimal occupanyPrecision is determined to be 2, the size of the occupancy map frame would be equal to (asps_frame_width/2)×(asps_frame_height/2). To generate the reduced resolution occupancy map frame, the occupancy map value for a particular position is set to 1 if the spatially corresponding 2×2 subblock at the full resolution occupancy frame has at least one non-zero value. The occupancy map video generated in this manner is compressed using a video coder such as VVC or AV-1 that allows frames with varying resolution. The V-PCC decoder decodes the occupancy map video and if necessary, upsamples each occupancy map frame using pixel replication to obtain an occupancy map frame of size asps_frame_width×asps_frame_height. The advantage of this embodiment is that the decision on appropriate occupancyPrecision to be used may be adapted to each frame.

Figure 14A:
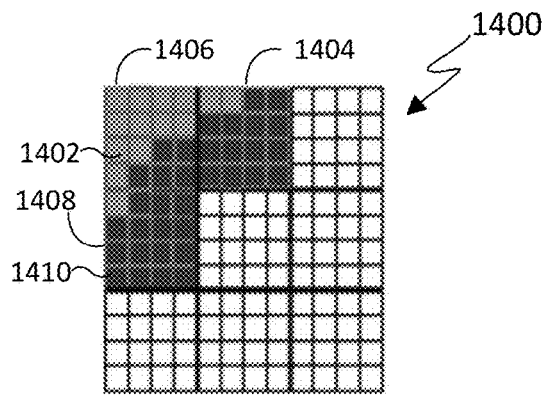
FIGS. 14A-C illustrate valid pixels and invalid pixels in occupancy maps according to various embodiments of this disclosure.
Figure 14B:
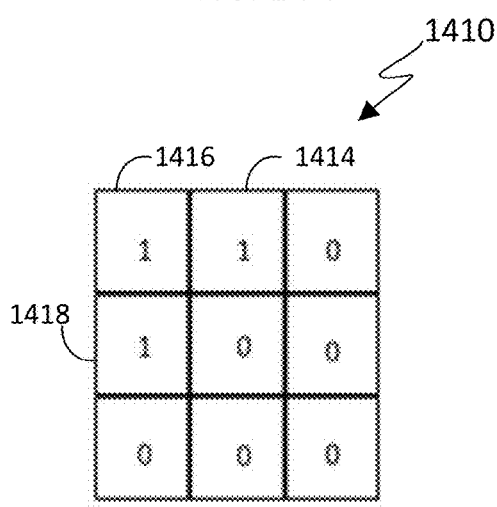

FIG. 14 illustrates valid pixels and invalid pixels generated during coding of occupancy maps according to various embodiments of this disclosure. FIG. 14A depicts a full-resolution occupancy map 1400 with a plurality of pixels 1402 spanning 4×4 blocks 1404, 1406, and 1408. FIG. 14B depicts a low-resolution occupancy map 1410 (i.e., a downsampled occupancy map) obtained by downsampling the full-resolution occupancy map 1400 by an occupancyPrecision of 4. The low-resolution occupancy map 1410 includes a value of 1 in blocks 1414, 1416, and 1418 in locations corresponding to blocks 1404, 1406, and 1408, respectively. A value of 0 is populated into the remaining blocks of the low-resolution occupancy map 1410 to indicate the absence of valid pixels.

Figure 14C:
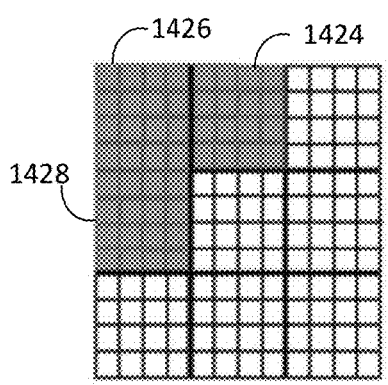

FIG. 14C depicts an upsampled occupancy map 1420 generated by upsampling the low-resolution occupancy map 1410 by the occupancyPrecision factor of 4. As a result, blocks 1424, 1426, and 1428 are fully pixelated. A comparison of the upsampled occupancy map 1420 and the original occupancy map 1400 shows that the plurality of pixels 1410 in FIG. 14A are invalid pixels that are considered as valid pixels at the decoder.

In this illustrative embodiment of FIG. 14, occupancyPrecision selection based on the ratio of invalid pixels to the number of valid pixels. If the ratio of invalid pixels to the number of valid pixels is smaller than a threshold, then the occupancyPrecision can be set to 4. Otherwise, a smaller value for occupancyPrecision can be selected. A corresponding flowchart for this embodiment is shown in the figure that follows.

Figure 15:
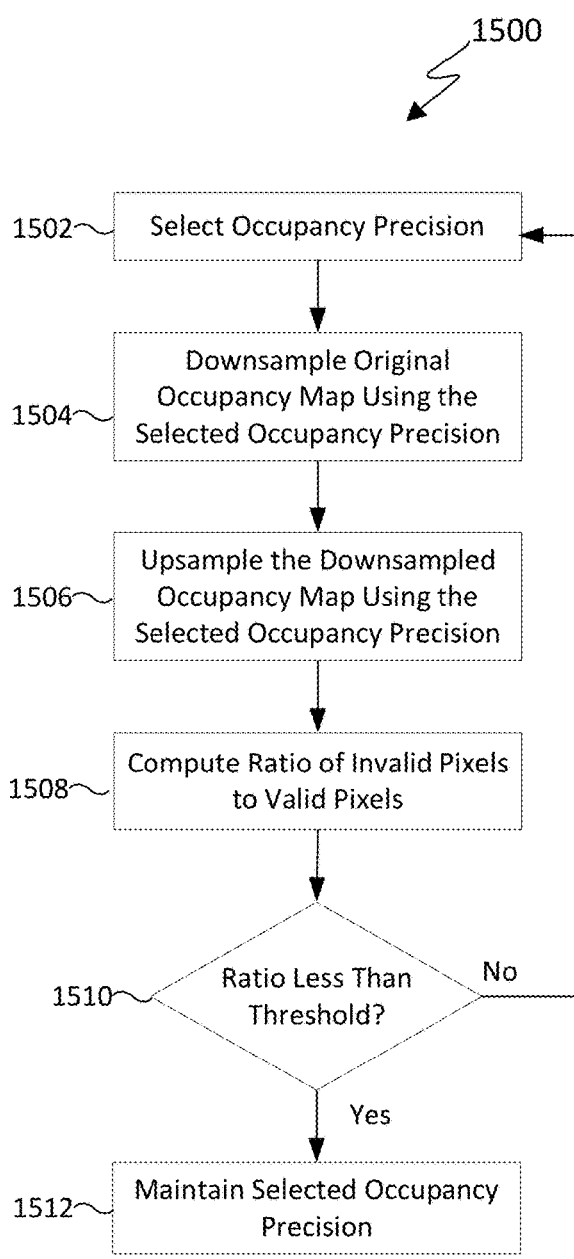
FIG. 15 illustrates a flowchart for selecting occupancy precision values based a comparison of valid pixels to invalid pixels according to various embodiments of this disclosure.

FIG. 15 illustrates a flowchart for selecting occupancy precision values based on a ratio of invalid pixels to invalid pixels according to various embodiments of this disclosure. Operations described in flowchart 1500 can be implemented in an encoder such as encoder 800 in FIG. 8. The encoder can be included in a server, such as server 200 in FIG. 2, or an electronic device, such as electronic device 300 in FIG. 3.

Flowchart 1500 begins at operation 1502 by selecting an occupancy precision value. In operation 1504, the original occupancy map is downsampled using the selected occupancy precision. The downsampled occupancy map is upsampled using the selected occupancy precision in operation 1506 and a ratio of invalid pixels to valid pixels is computed in operation 1508.

In operation 1510 a determination is made as to whether the computed ratio is less than a predetermined pixel ratio. If the computed ratio is less than the predetermined pixel ratio, then the selected occupancy precision is maintained in operation 1512. Otherwise, if the computed ratio is greater than the predetermined pixel ratio, then flowchart 1500 returns to operation 1502 to select another occupancy precision value.

Figure 16:
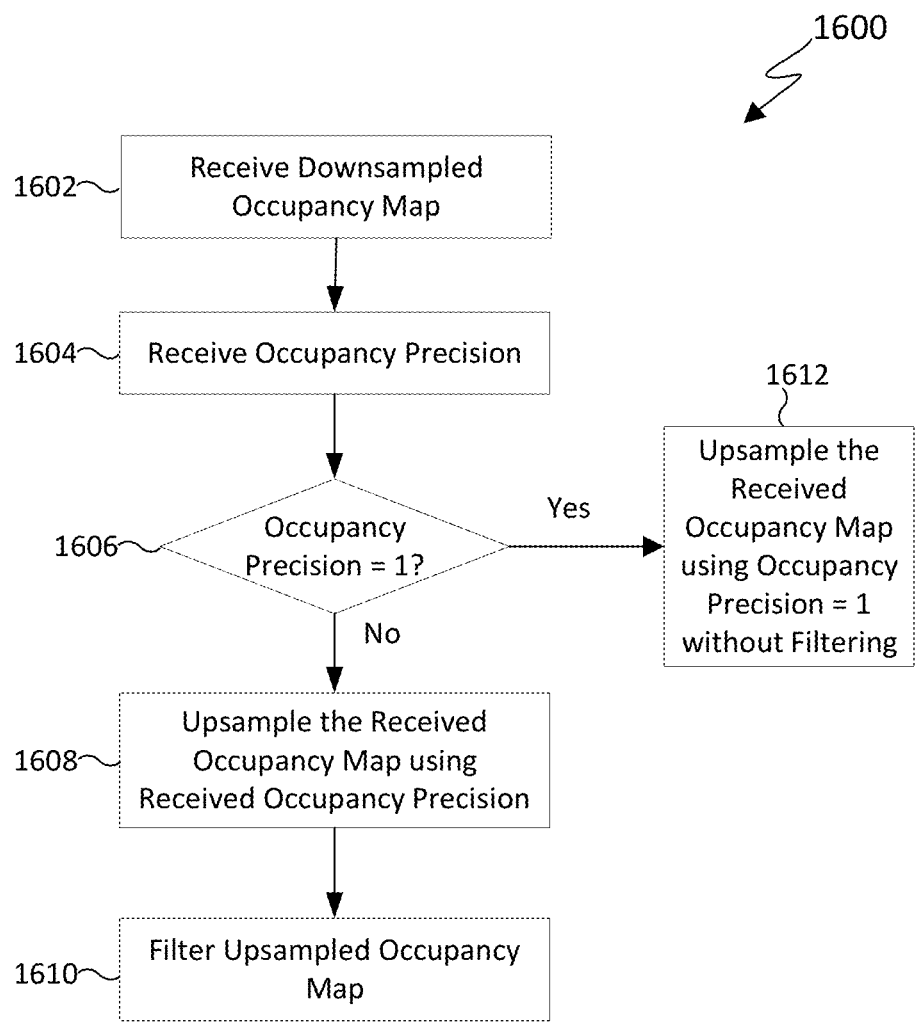
FIG. 16 illustrates a flowchart for constrained occupancy map filtering at a decoder according to various embodiments of this disclosure.

In another embodiment, an upsampled occupancy map will be filtered to remove invalid pixels. The filtering will be constrained to filter out only invalid pixels and retain valid pixels. Since for occupancy precision value of 1 there is no invalid pixels in the upsampled occupancy map, no filtering is performed on the upsampled occupancy map. FIG. 16 shows a flowchart for the constrained occupancy map filtering based on the value of the occupancy precision at the decoder. However, in an alternate embodiment the decision can be made at the encoder and signaled to the decoder.

FIG. 16 illustrates a flowchart for constrained occupancy map filtering at a decoder according to various embodiments of this disclosure. Operations of flowchart 1600 can be implemented in a decoder such as decoder 900 in FIG. 9. The decoder can be included in an electronic device such as electronic device 300 in FIG. 3, or a server 200 in FIG. 3.

Flowchart 1600 begins at operation 1602 by receiving a downsampled occupancy map. In operation 1604 an occupancy precision value is received. In operation 1606 a determination is made as to whether the occupancy precision value is equal to 1. If the occupancy precision value received in operation 1604 is not equal to 1, then in operation 1608 the received occupancy map is upsampled using the received occupancy precision value. Thereafter, the upsampled occupancy map is subjected to constrained filtering in operation 1610.

Returning to operation 1606, if the determination is made that the occupancy precision value is equal to 1, then flowchart 1600 proceeds to operation 1612 where the received occupancy map is upsampled using an occupancy precision value of 1. As mentioned earlier, the upsampled occupancy map is not subjected to further filtering.

Figure 17:
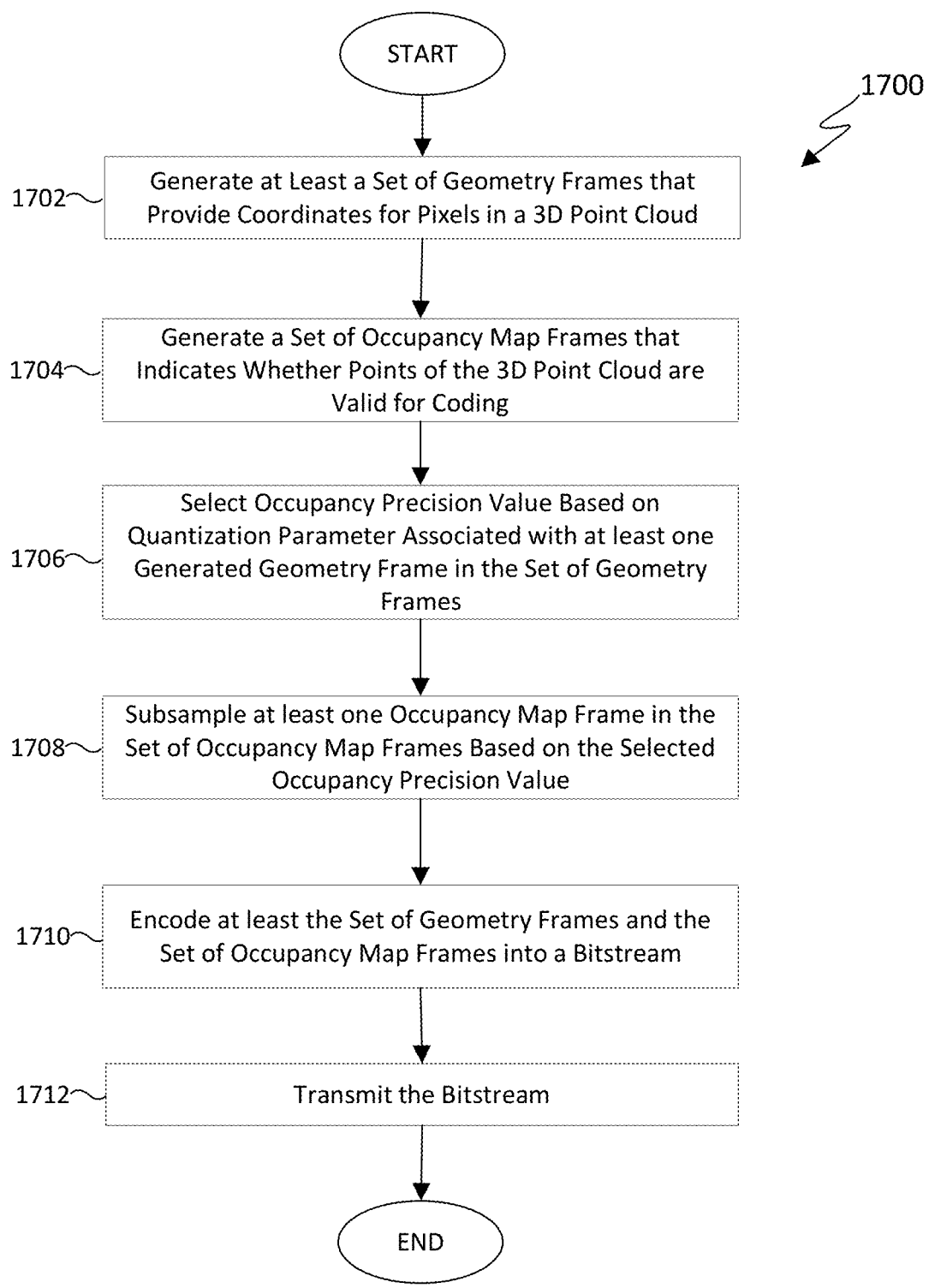
FIG. 17 illustrates a flowchart of a process for encoding a 3D point cloud according to various embodiments of this disclosure.

FIG. 17 illustrates a flowchart of a process for encoding a 3D point cloud according to various embodiments of this disclosure. Operations of flowchart 1700 can be implemented in an encoder such as encoding unit 800 in FIG. 8. Additionally, the encoder can be included in a server, such as server 200 in FIG. 2, or an electronic device, such as electronic device 300 in FIG. 3.

Flowchart 1700 begins at operation 1702 by generating at least a set of geometry frames that provide coordinates for points in the 3D point cloud. In operation 1704, a set of occupancy map frames are generated which indicates whether the points of the 3D point cloud in the set of geometry frames are valid for coding. In some embodiments, a set of geometry frames and/or a set of atlas frames may also be generated.

In operation 1706, an occupancy precision value is selected based on a quantization parameter (QP) associated with at least one generated geometry frame in the set of geometry frames. In at least one embodiment, the selected occupancy precision value is a first value when the QP is less than a first QP threshold; the selected occupancy precision value is a second value that is higher than the first value when the QP is between the first QP threshold and a second QP threshold; and the selected occupancy precision value is a third value that is higher than the second value when the QP is greater than the second threshold. For example, the first value can be 1, the second value can be 2, and the third value can be 4.

In operation 1708, at least one occupancy map frame in the set of occupancy map frames is subsampled based on the selected occupancy precision value. In some embodiments, the occupancy map frame can be subsampled using different occupancy precision values. For example, interior blocks of the at least one occupancy map frame can be subsampled with a higher occupancy precision value (e.g., 2 or 4), and the exterior blocks of the occupancy map frame can be subsampled with a lower occupancy precision value (e.g., 1 or 2) when they are partially filled.

Thereafter, at least the set of geometry frames and the set of occupancy map frames are encoded into a bitstream. As discussed other illustrative embodiments, the encoded bitstream may also include a set of attribute frames, a set of atlas frames, and auxiliary patch-information. In operation 1712 the encoded bitstream is transmitted.

In some embodiments, the method includes another step of transmitting one or more subblock occupancy indicators in the at least one occupancy map frame that has been subsampled. Alternatively, the one or more subblock occupancy indicators can be transmitted in a supplemental enhancement information (SEI) message.

In other embodiments, different occupancy map frames in the set of occupancy map frames can be subsampled with different occupancy precision values. Thus, the process in FIG. 17 can include determining another occupancy precision value that differs from the selected occupancy precision value and subsampling another occupancy map frame in the set of occupancy map frames with the other occupancy precision value.

In some other embodiments, the occupancy precision value can be determined or modified based on a percentage of invalid pixels at a highest occupancy precision value and a ratio of bits for the at least one occupancy map frame and bits for the at least one geometry frame that corresponds to the at least one geometry frame.

Figure 18:
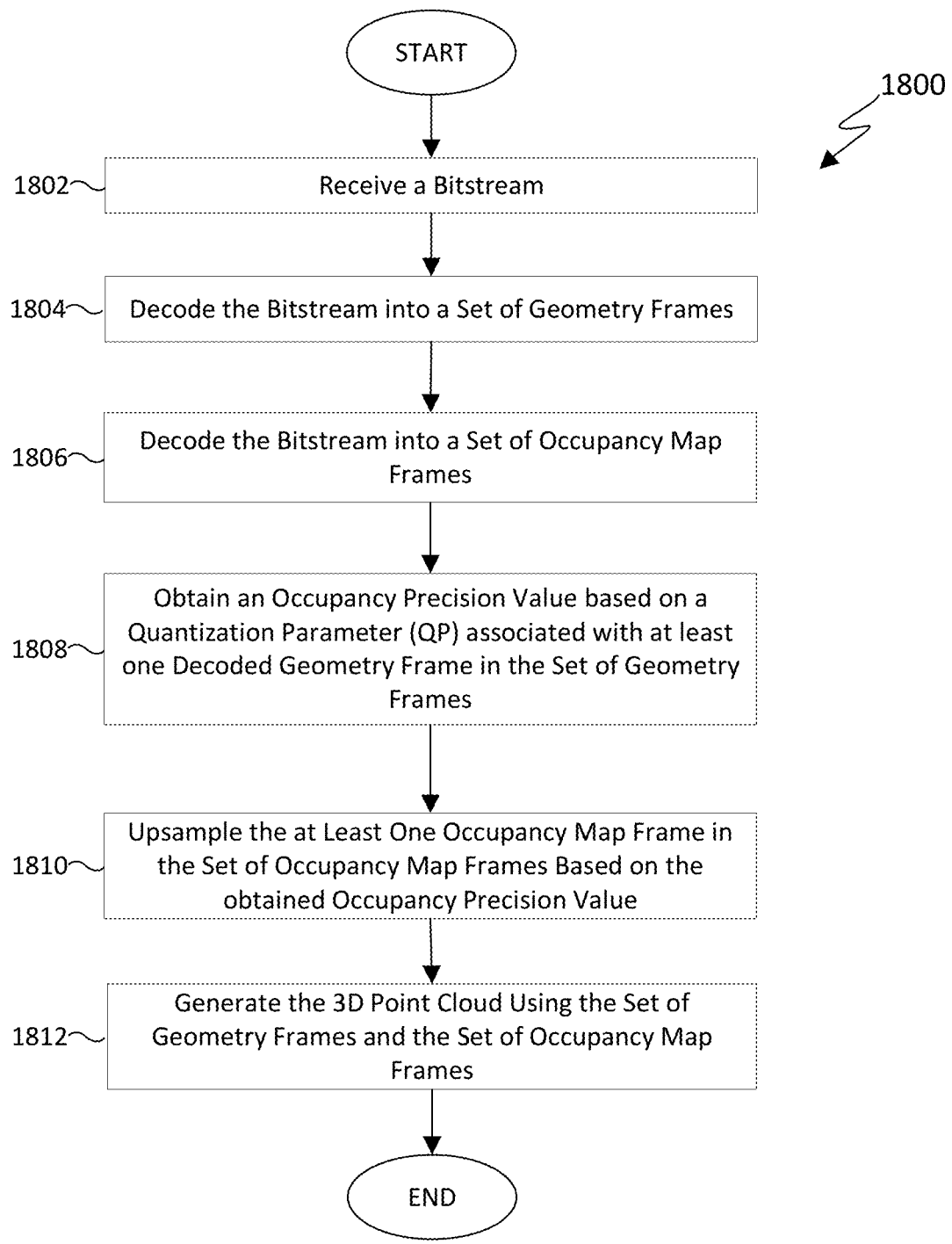
FIG. 18 illustrates a flowchart of a process for decoding a 3D point cloud according to various embodiments of this disclosure.

FIG. 18 illustrates a flowchart of a process for decoding a 3D point cloud according to various embodiments of this disclosure. Operations of flowchart 1800 can be implemented in a decoder such as decoding unit 900 in FIG. 9. Additionally, the decoder can be included in an electronic device such as electronic device 300 in FIG. 3, or a server, such as server 200 in FIG. 2.

Flowchart 1800 begins at operation 1802 by receiving a bitstream. In operation 1804, the bitstream is decoded into a set of geometry frames. The bitstream is also decoded into a set of occupancy map frames in operation 1806.

In operation 1808 an occupancy precision value is obtained based on a quantization parameter (QP) associated with the at least one decoded geometry frame in the set of geometry frames. In at least one embodiment, the obtained occupancy precision value is a first value when the QP is less than a first QP threshold; the obtained occupancy precision value is a second value that is higher than the first value when the QP is between the first QP threshold and a second QP threshold; and the obtained occupancy precision value is a third value that is higher than the second value when the QP is greater than the second threshold. For example, the first value can be 1, the second value can be 2, and the third value can be 4.

In operation 1810 the at least one occupancy map frame in the set of occupancy map frames is upsampled based on the obtained occupancy precision value. In some embodiments, the occupancy map frame can be upsampled using different occupancy precision values. For example, interior blocks of the at least one occupancy map frame can be upsampled with a higher occupancy precision value (e.g., 2 or 4), and the exterior blocks of the occupancy map frame can be upsampled with a lower occupancy precision value (e.g., 1 or 2) based on one or more subblock occupancy indicators when the exterior blocks are partially filled. In some embodiments, the subblock occupancy indicators are obtained in the at least one occupancy map frame. In other embodiments, the one or more subblock occupancy indicators can be obtained from a supplemental enhancement information (SEI) message.

In operation 1812, the 3D point cloud is generated using the set of geometry frames and the set of occupancy map frames.

In some embodiments where the set of occupancy map frames includes at least another occupancy map frame subsampled at a different occupancy precision value, the method also includes the step of obtaining another occupancy precision value that differs from the selected occupancy precision value and upsampling the other occupancy map frame with the other occupancy precision value.

Constrained Trimming

The extension of the full resolution occupancy map often occurs at boundary blocks where the block of N×N points are neighbor to empty blocks. Recently, some techniques have been introduced to filter the up-sampled occupancy map and trim invalid points from the occupancy map at the decoder. Although these methods succeed in trimming many invalid points, they also remove some of the valid points. This has adverse impact on the visual quality of the reconstructed point cloud. Some embodiments of this disclosure involve constrained occupancy map trimming that avoids removing valid points. Instead of using a binary occupancy map (i.e. taking a value of 0 or 1), an m-ary occupancy map is used and the value of the occupancy map is defined according to the occupancy pattern of a boundary block in the high-resolution occupancy map. Some embodiments allow for more aggressive occupancy map trimming that removes a limited number of valid points while removing more invalid points from the occupancy map. The following section describes various embodiments for constrained trimming of the occupancy map.

In one method according to constrained occupancy map trimming, it will be decided at the encoder if and how the occupancy map in each block will be trimmed. This decision can be communicated to the decoder through various means. Some exemplary mechanisms for conveying this decision to the decoder include: transmitting the decision in Supplementary Enhancement Information (SEI); sending a specific number for each block to the decoder to indicate if and how a block will be trimmed; sending a binary map or m-ary map to the decoder to indicate which blocks will be trimmed; embedding the decision into various videos either through changing the value of the video samples (e.g. occupancy map value, etc.) or adding it to a video as a separate patch; and including the decision in the patch data unit. Also, the number of bits used to indicate the decision on occupancy map trimming for each patch can be signaled at the frame level to remove parsing dependency on decoding of the occupancy map.

Figure 19:
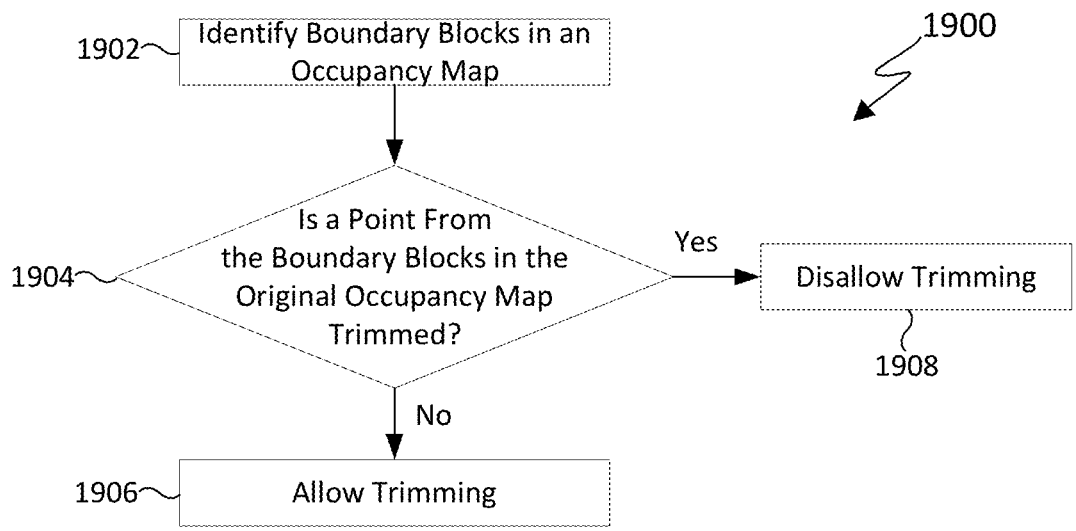
FIG. 19 illustrates a flowchart for occupancy map trimming at an encoder according to various embodiments of this disclosure.
Figure 20:
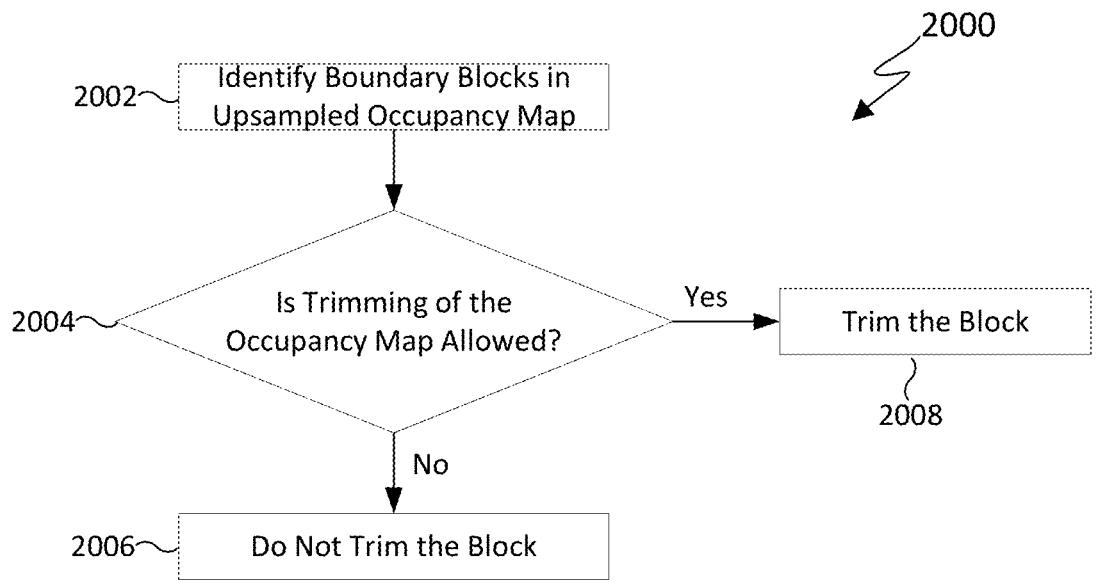
FIG. 20 illustrates a flowchart for occupancy map trimming at a decoder according to various embodiments of this disclosure.
Figure 21A:
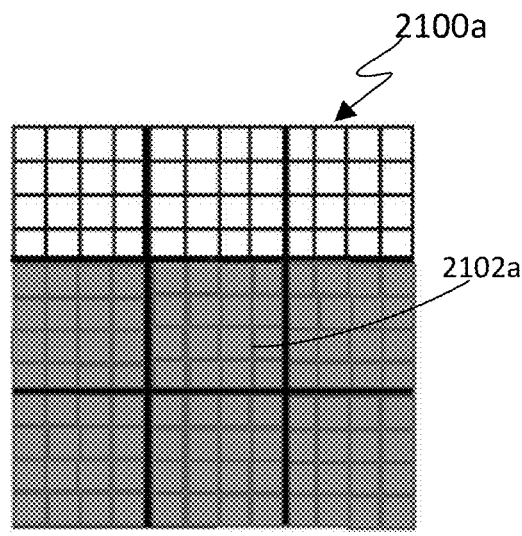
FIGS. 21A-D illustrate boundary block types for use in occupancy map trimming based on predefined occupancy patterns according to various embodiments of this disclosure.
Figure 21B:
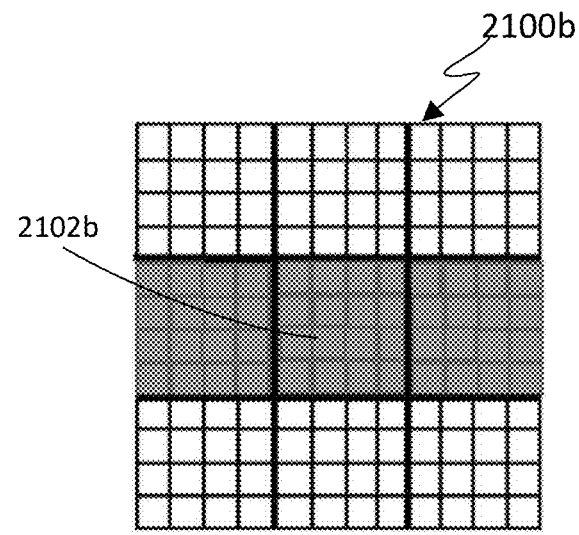
Figure 21C:
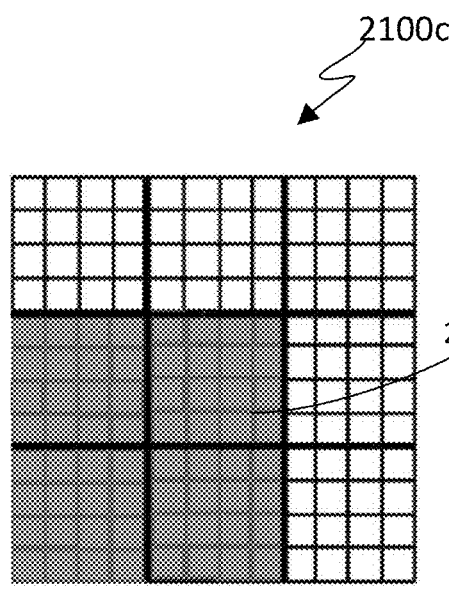
Figure 21D:
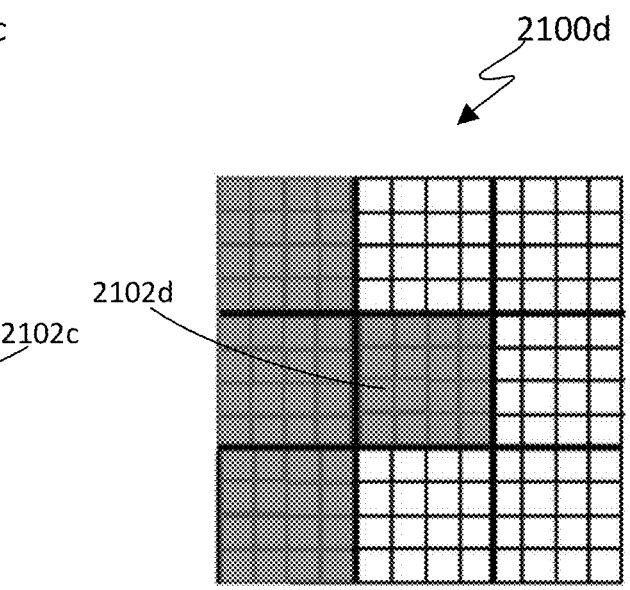

In a first embodiment, for any occupancy map trimming technique (e.g., techniques based on predefined occupancy patterns, techniques based on upsampling/filtering, etc.), it will be determined at the encoder if any (valid) point from a block in the original high resolution occupancy map will be removed when the block is trimmed. If a valid point from a block would be removed when the block is trimmed, then that block will be excluded from trimming and this decision will be conveyed to the decoder. FIG. 19 and FIG. 20 are flowcharts for an encoder and decoder, respectively, for this first embodiment.

FIG. 19 illustrates a flowchart for occupancy map trimming at an encoder according to various embodiments of this disclosure. Operations described in flowchart 1900 can be implemented in an encoder such as encoder 800 in FIG. 8. The encoder can be included in a server, such as server 200 in FIG. 2 or an electronic device such as electronic 300 in FIG. 3.

Flowchart 1900 begins at operation 1902 by identifying boundary blocks in an occupancy map. A determination is made in operation 1904 as to whether a point from the boundary blocks in the original occupancy map is trimmed. If a point from the boundary blocks of the original occupancy map is not trimmed, then trimming is allowed in operation 1906 and the decision is conveyed to the decoder. However, if in operation 1904 a determination is made that a valid point from the boundary blocks in the original occupancy map is trimmed, then trimming is disallowed in operation 1908 and the decision is conveyed to the decoder.

FIG. 20 illustrates a flowchart for occupancy map trimming at a decoder according to various embodiments of this disclosure. Operations described in flowchart 2000 can be implemented in a decoder such as decoding unit 900 in FIG. 9. The decoding unit can be included in an electronic device, such as electronic device 300 in FIG. 3 or in a server, such as server 200 in FIG. 2.

Flowchart 2000 begins at operation 2002 by identifying boundary blocks in an upsampled occupancy map then a determination is made in operation 2004 as to whether trimming of the occupancy map is allowed. If trimming of the occupancy map is not allowed, then the boundary blocks are not trimmed in operation 2006. However, if trimming of the occupancy map is allowed, then boundary blocks are trimmed in operation 2008.

In another embodiment of constrained trimming, the boundary blocks of N×N points (e.g. N=4), where at least one side of the block neighboring an empty block or a block belonging to another patch in the upsampled occupancy map, are identified.

For each type of boundary blocks, as shown in FIG. 21, the most probable occupancy pattern in the original high resolution occupancy map is found and in the original occupancy map, if the unoccupied part of a boundary block covers the un-occupied part of the predefined occupancy pattern, the occupancy value of the block in the low resolution occupancy map is set to a value to indicate that the block can be trimmed, e.g., occupancy value=1. If the block contains any valid pixel in the area that corresponds to the unoccupied part of the predefined occupancy pattern, the occupancy value of the block in the low-resolution occupancy map is set to a value that indicates that the boundary block cannot be trimmed, e.g., occupancy value=2.

FIG. 21 illustrates boundary block types for use in occupancy map trimming based on predefined occupancy patterns according to various embodiments of this disclosure. FIG. 21A depicts a boundary block 2100a with only one side neighboring an empty block or a block belonging to another patch. FIG. 21B depicts a boundary block 2100b with only two parallel sides neighboring empty blocks or blocks belonging to another patch. FIG. 21C depicts a boundary block 2102c with only two crossing sides neighboring empty blocks or blocks belonging to another patch. FIG. 21D depicts a boundary block 2102d with three sides neighboring empty blocks or blocks belonging to another patch.

Figure 22:
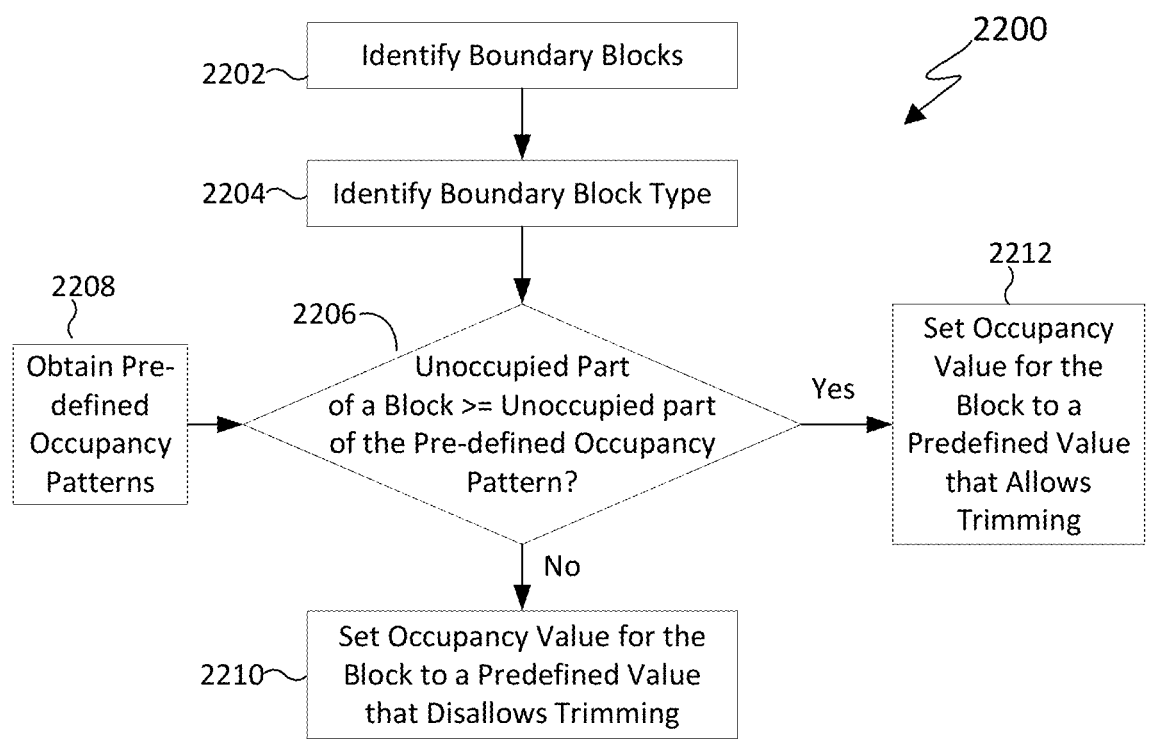
FIG. 22 illustrates a flowchart for occupancy map trimming at an encoder based on predefined occupancy patterns according to various embodiments of this disclosure.

FIG. 22 illustrates a flowchart for occupancy map trimming at an encoder based on predefined occupancy patterns according to various embodiments of this disclosure. Operations described in flowchart 2200 can be implemented in an encoder, such as encoder 800 in FIG. 8. The encoder can be included in a server, such as server 200 in FIG. 2 or an electronic device, such as electronic device 300 in FIG. 3.

Flowchart 2200 begins at operation 2202 by identifying boundary blocks. In operation 2204, the boundary block type is identified from one of the four types shown in FIG. 21. In operation 2206, a determination is made as to whether the unoccupied part of a boundary block is greater than or equal to the unoccupied part of the predefined occupancy pattern that is obtained in operation 2208. If the unoccupied part of a boundary block is not greater than or equal to the unoccupied part of a predefined occupancy pattern, then in operation 2210 the occupancy value of the boundary block is set to a value that disallows trimming. If the unoccupied part of a boundary block is greater than or equal to the unoccupied part of a predefined occupancy pattern, then in operation 2212 the occupancy value of the boundary block is set to a value that allows trimming.

Note that the more occupancy patterns are defined for boundary blocks, the larger would be the size of the occupancy map file since the values in the occupancy map would be multiple values rather than binary values. As such, a trade-off exists between the removal of extended points from the up-sampled occupancy map and the size of the m-ary occupancy map file. Otherwise, the objective scores would be degraded.

If multiple predefined occupancy patterns are defined for any type of boundary blocks, the occupancy pattern will be chosen based on some criterion, e.g. choosing the one that removes a higher number of invalid pixels, introduces the least number of spurious points, etc.

The set of occupancy patterns for each type of boundary blocks can be defined at different levels, i.e. patch level, frame level or sequence level. If the occupancy patterns are defined at a lower level (i.e. patch level), more accurate trimming of the occupancy map can be performed at the cost of more metadata to be sent to the decoder.

Figure 23:
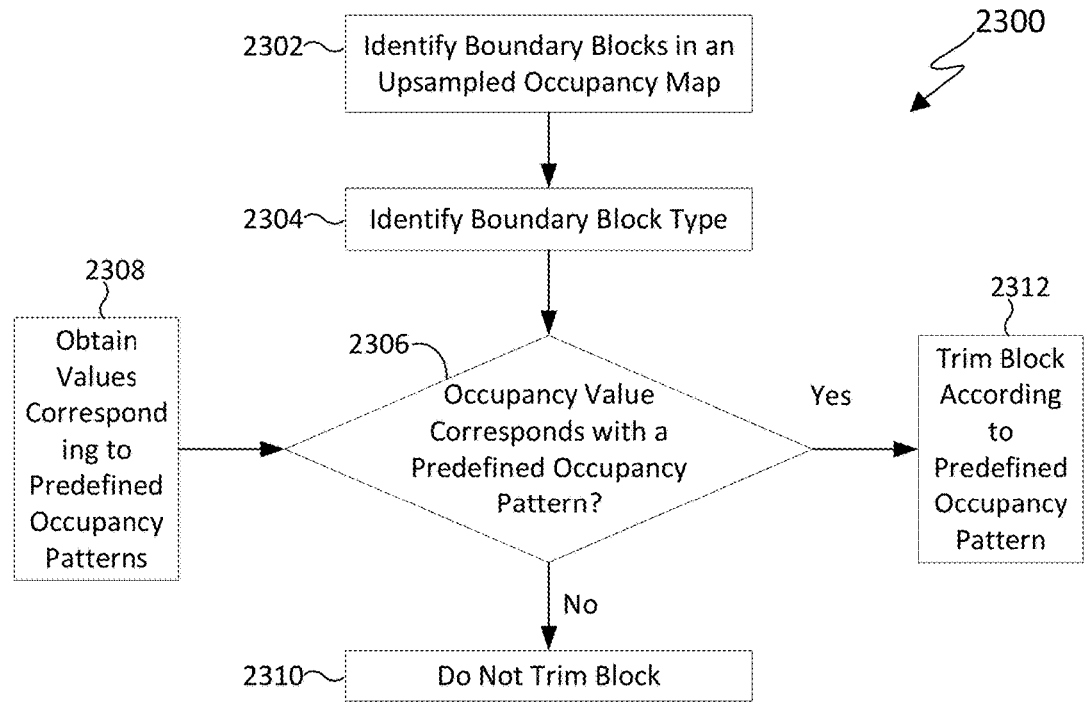
FIG. 23 illustrates a flowchart for occupancy map trimming at a decoder based on predefined occupancy patterns according to various embodiments of this disclosure.

FIG. 23 illustrates a flowchart for occupancy map trimming at a decoder based on predefined occupancy patterns according to various embodiments of this disclosure. Operations described in flowchart 2300 can be implemented in a decoder such as decoding unit 900 in FIG. 9. The decoding unit can be included in an electronic device, such as electronic device 300 in FIG. 3 or in a server, such as server 200 in FIG. 2.

Flowchart 2300 begins at operation 2302 by identifying boundary blocks in an upsampled occupancy map. In operation 2304 the boundary block type is identified from one of the four types shown in FIG. 21. In operation 2306 a determination is made as to whether the occupancy value of an identified boundary block corresponds with a predefined occupancy pattern value obtained in operation 2308. If the occupancy value of the identified boundary block does not correspond to a value of a predefined occupancy block, then the boundary block is not trimmed in operation 2310. Otherwise, if the occupancy value of the identified boundary block does correspond to a value of a predefined occupancy block, then the boundary block is trimmed in operation 2312.

In a non-limiting embodiment, an occupancy value of 1 allows for trimming whereas an occupancy value of 2 does not allow for trimming. Thus, at the decoder, if the occupancy value for a boundary block equals 1, the points in the corresponding boundary block of the upsampled occupancy map are removed according to that occupancy pattern. Otherwise if the occupancy value equals 2, no points of the corresponding boundary block of the upsampled occupancy map will be removed.

Figures 24A, 24B:
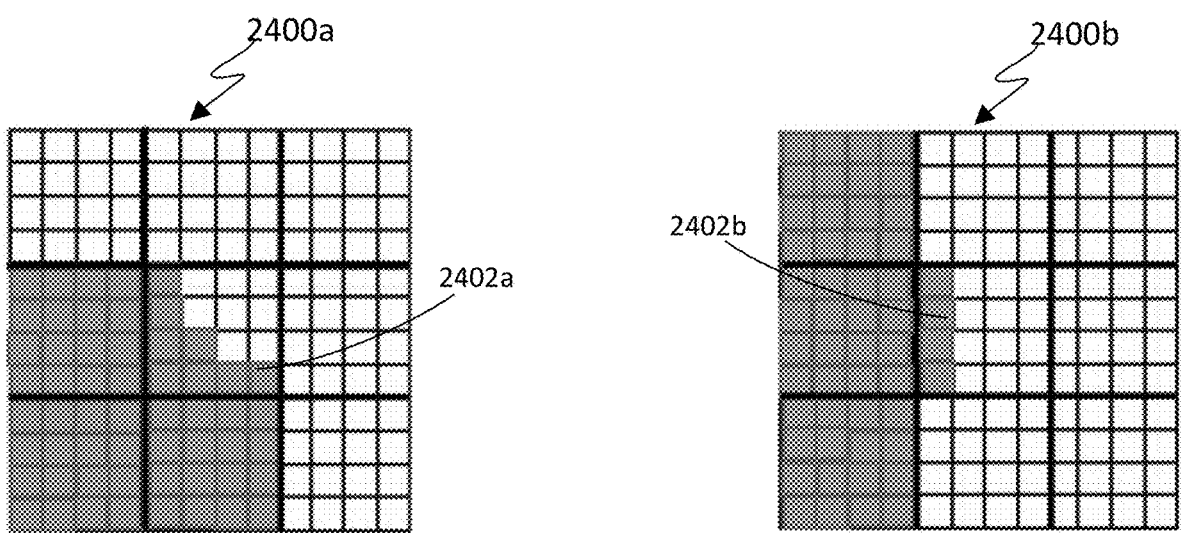
FIGS. 24A-B illustrate exemplary predefined occupancy patterns according to various embodiments of this disclosure.

FIG. 24 illustrates exemplary predefined occupancy patterns according to various embodiments of this disclosure. In particular, FIG. 24A depicts predefined occupancy pattern 2402a for a boundary block corresponding the boundary block shown in FIG. 21C. FIG. 24B depicts predefined occupancy pattern 2402b for a boundary block corresponding to the boundary block shown in FIG. 21D.

A ternary occupancy map can be defined in the range of [0,2]. In this example, boundary blocks 2402a and 2402b are the most probable occupancy patterns for the original high-resolution occupancy map. For a boundary block, if all the points in the un-occupied part of the predefined occupancy pattern are un-filled, the occupancy value for the block is set to 1, otherwise a value of 2 is assigned to the occupancy value. At the decoder, if the occupancy value for a boundary block equals to 1, the upsampled occupancy map will be trimmed according to the predefined occupancy pattern, otherwise no points will be trimmed from the upsampled occupancy pattern. FIG. 25 shows an example of the full resolution occupancy pattern and the resulting downsampled and up-sampled occupancy maps using the pre-defined occupancy patterns for boundary blocks shown in FIG. 24.

Figure 25A:
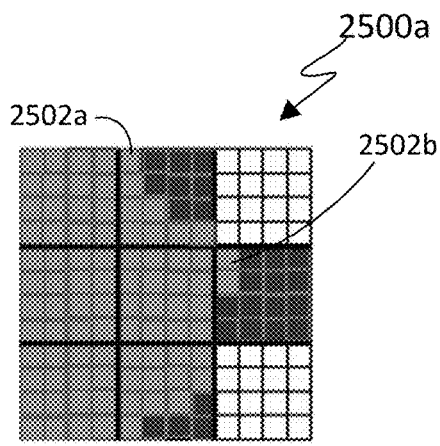
FIGS. 25A-C illustrate downsampled and upsampled occupancy maps using the predefined occupancy patterns from FIG. 24.
Figure 25B:
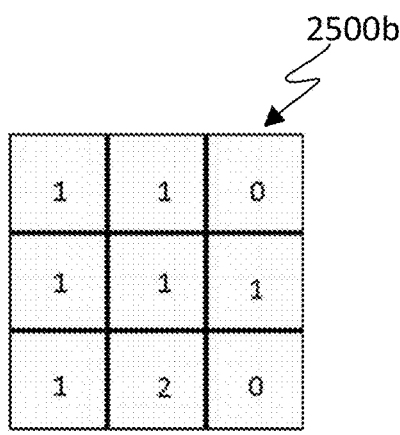
Figure 25C:
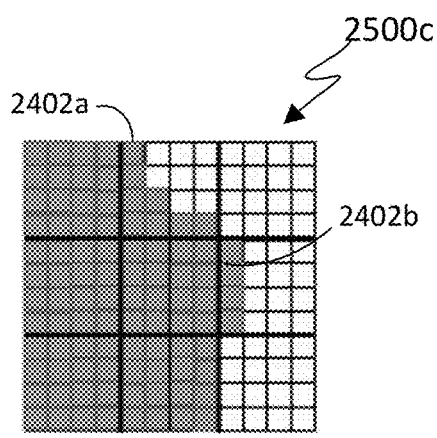

FIG. 25 illustrates downsampled and upsampled occupancy maps using the predefined occupancy patterns from FIG. 24. An encoder, such as encoder 800 in FIG. 8, can generate the original, full-resolution occupancy map 2500a in FIG. 25a and the downsampled occupancy map 2500b in FIG. 25B. A decoder, such as decoder 900 in FIG. 9, can generate the upsampled occupancy map 2500c in FIG. 25c from the predefined occupancy patterns shown in FIG. 24.

In this example in FIG. 25, the encoder identifies boundary blocks 2502a and 2502b in the occupancy map 2500a and generates a ternary downsampled occupancy map 2500b that includes a value of 0, 1, or 2 in each of the blocks. An occupancy value of 0 indicates the absence of pixels in the original occupancy map. An occupancy value of 1 indicates a correlation with a predefined occupancy pattern, and a value of 2 indicates a lack of correlation with a predefined occupancy pattern. The decoder can then trim the boundary blocks 2502a and 2502b to match the predefined occupancy patterns 2402a and 2402b, respectively, from FIG. 24. The trimmed occupancy map 2500c is shown in FIG. 25C.

Figure 26A:
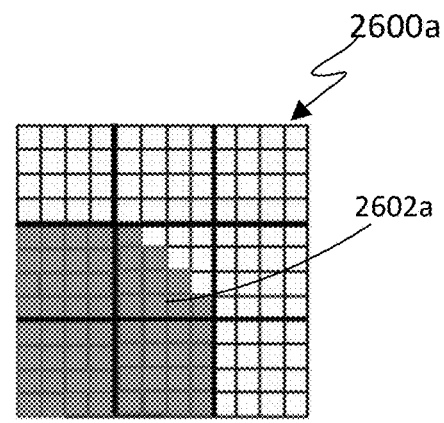
FIGS. 26A-B illustrate additional predefined occupancy patterns for boundary blocks according to various embodiments of this disclosure.
Figure 26B:
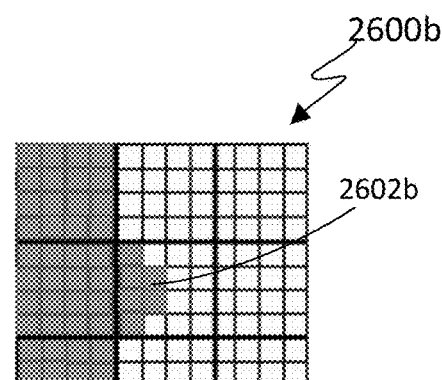

The predefined boundary blocks shown in FIG. 24 are two non-limiting examples of boundary blocks. FIG. 26 illustrates two additional predefined occupancy patterns for boundary blocks according to various embodiments of this disclosure. In particular, FIG. 26A depicts occupancy map 2600a that includes predefined occupancy pattern 2602a, which corresponds with boundary block type 2102c in FIG. 21C. FIG. 26B depicts occupancy map 2600b that includes predefined occupancy pattern 2602b, which corresponds with boundary block type 21D in FIG. 21D.

In the previous constrained trimming embodiment, no points from the original high-resolution occupancy map was trimmed. As a result, many extended points in the up-sampled occupancy map will be kept since many boundary blocks cannot be trimmed. In another embodiment, a few points (e.g. 1 or 2 original points in a block of N×N points) from the original high-resolution occupancy map can be trimmed. For example, in this embodiment, if the unoccupied part of a boundary block in the original occupancy map covers a corresponding unoccupied part of one of the predefined occupancy pattern or differs by a predefined number of points, e.g., 1 or 2 points, then the occupancy value of the block in the downsampled occupancy map, i.e., the low-resolution occupancy pattern, can be set to the value corresponding to that occupancy pattern. Otherwise, the occupancy value can be set to a predefined value indicating that the boundary block cannot be trimmed.

That would lead to the removal of many unwanted points in the upsampled occupancy map. The operation of the decoder in this embodiment would proceed according to the operations of flowchart 2300 in FIG. 23. Operation of the encoder in this embodiment would proceed according to the operations of flowchart discussed in more detail in FIG. 27 that follows.

Figure 27:
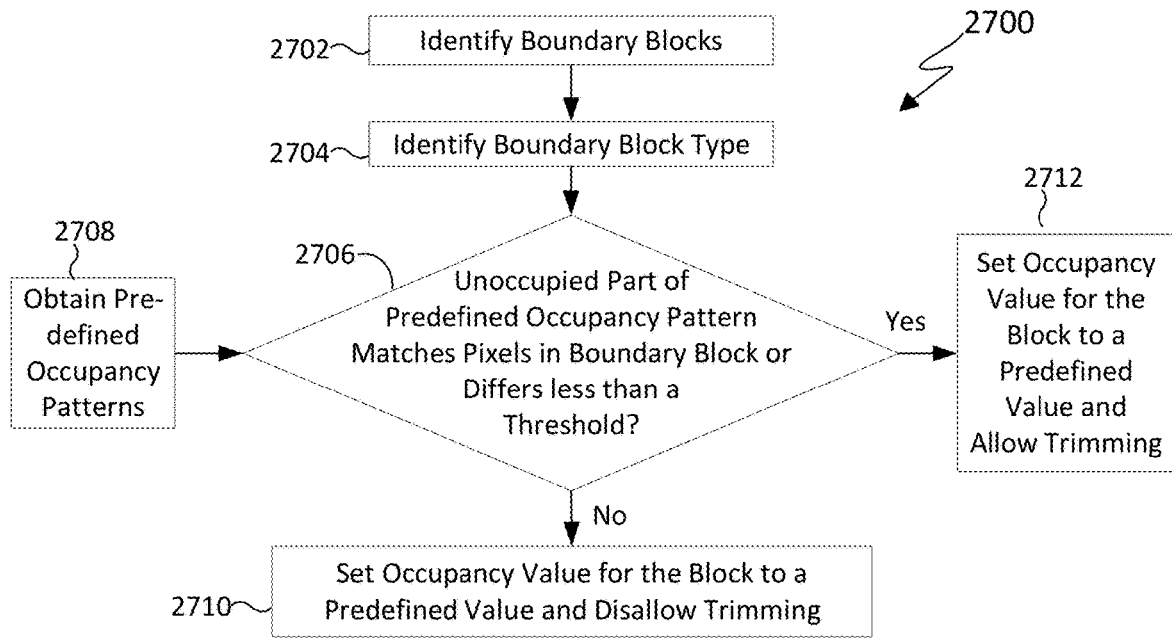
FIG. 27 illustrates a flowchart for occupancy map trimming at an encoder according to various embodiments of this disclosure.

FIG. 27 illustrates a flowchart for occupancy map trimming at an encoder according to various embodiments of this disclosure. Operations of flowchart 2700 can be performed by an encoder, such as encoder 800 in FIG. 8.

Flowchart 2700 begins at operation 2702 by identifying boundary blocks. In operation 2704 boundary block types are identified. In operation 2706 a determination is made as to whether the unoccupied part of a predefined occupancy pattern obtained from operation 2708 matches the corresponding pixels in the boundary block or differs by less than some occupancy threshold. If the unoccupied part of the predefined occupancy pattern does not match the corresponding pixels in the boundary block or does not differ by less than some occupancy threshold, then flowchart 2700 proceeds to operation 2710 where the occupancy value for the boundary block is set to a predefined value and trimming is disallowed. Otherwise, flowchart 2700 proceeds to operation 2712 where the occupancy value for the boundary block is set to a predefined value and trimming is allowed.

In another embodiment, each block boundary is divided into four sub-blocks of 2×2 points. The occupancy of each sub-block can be determined (e.g., 1: occupied, 0: empty). As a result, the occupancy situation of the boundary block is specified by four bits. These four bits can be converted to a decimal value and be used as the occupancy value for the boundary block in the down-sampled occupancy pattern. Alternatively, these four bits can be sent out to the decoder through other mechanism including an extension to the occupancy map video, etc. As an alternative to this embodiment, the occupancy situation of a boundary block can be characterized at the pixel level that would require N×N bits to do so for a block of N×N pixels.

In another embodiment, other types of boundary blocks can be identified by taking into consideration the occupancy situation of upper-left, lower-left, upper-right and lower-right neighboring blocks. In total, 8 neighboring blocks (i.e. left, right, top, bottom, upper-left, lower-left, upper-right and lower-right neighboring) will be used to identify the type of boundary block.

In another embodiment, in order to reduce the size of the m-ary occupancy map video (compared to binary occupancy map), the occupancy map video will be compressed in a lossy mode. This would lead to change in the value of the occupancy map for some boundary blocks and as such some un-wanted trimming will be performed on some boundary blocks. If the occupancy map is compressed at high bitrates, the lossy compression might not cause significant degradation in the visual quality while improving the objective scores.

In another embodiment, the up-sampled occupancy map can be trimmed by upsampling the low-resolution occupancy map by a factor of 4 in both horizontal and vertical directions (for occupancy resolution=4), applying a 2D filter to the upsampled occupancy map, and trimming any value less than a pre-defined threshold in the filtered occupancy map.

For the embodiments described above, an m-ary occupancy map can still be used to identify the occupancy pattern of the boundary blocks. Only pixels in the unfilled part of the occupancy pattern will be allowed to be trimmed (if the value is less than a threshold), otherwise the pixels in the filled part of the occupancy pattern will not be trimmed. Operation of the encoder in this embodiment would proceed according to flowchart 2200 in FIG. 22. Operation of the decoder in this embodiment would proceed according to flowchart depicted in FIG. 28 that follows.

Figure 28:
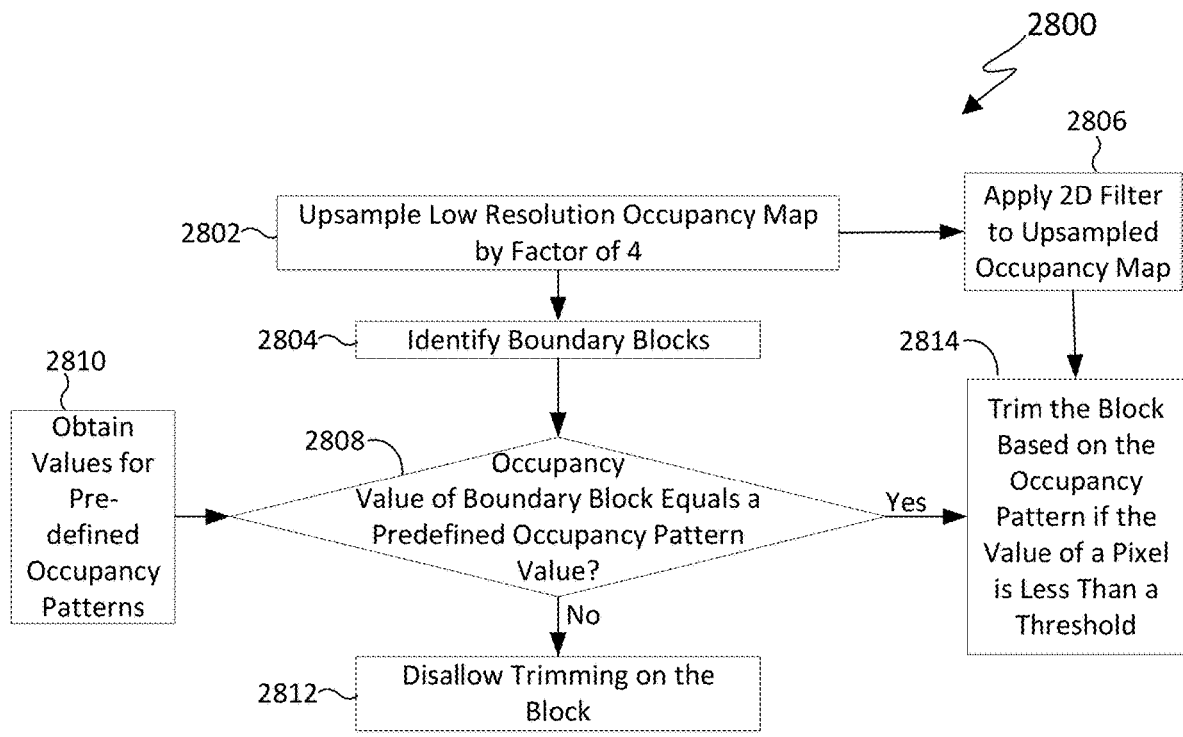
FIG. 28 illustrates a flowchart for occupancy map trimming at a decoder according to various embodiments of this disclosure.

FIG. 28 illustrates a flowchart for trimming an occupancy map at a decoder using a 2D filter according to various embodiments of this disclosure. Operations described in flowchart 2800 can be implemented in a decoder of an electronic device, such as decoding unit 800 in FIG. 8. The decoder can be included in a server, such as server 200 in FIG. 2, or an electronic device such as electronic device 300 in FIG. 3.

Flowchart 2800 begins at operation 2802 by upsampling a low-resolution occupancy map by a factor corresponding to the occupancy precision value selected for the occupancy map at the encoder. In this illustrative embodiment, the low-resolution occupancy map is upsampled by a factor of 4. A 2D filter is applied to the upsampled occupancy map in operation 2806 and boundary blocks are identified in operation 2804.

In operation 2808, a determination is made as to whether the occupancy value of a boundary block equals a predefined occupancy pattern value obtained from operation 2810. If the occupancy value of the boundary block is not equal to a predefined occupancy pattern value, then flowchart 2800 proceeds to operation 2812 where trimming is disallowed on the boundary block. Otherwise, flowchart 2800 proceeds to operation 2814 where the boundary block is trimmed based on the occupancy pattern if the value of a pixel is less than a threshold.

In another embodiment, the upsampled occupancy map can be trimmed at the decoder according to the operations of flowchart 2800 in FIG. 28. However, some of the original pixels in the high-resolution occupancy map will be allowed to be trimmed. In the process of identifying an occupancy pattern for a boundary block, if in the original occupancy map the occupied part of a boundary block matches one of the previously defined occupancy pattern or differs by a predefined number of points (e.g. 1 or 2 points), the occupancy value of the boundary block in the downsampled occupancy map (i.e. low-resolution occupancy pattern) can be set to the value corresponding to that occupancy pattern. At the decoder, if a boundary block has been identified as a predefined occupancy pattern, the pixels in the unfilled part of the occupancy pattern can be trimmed if the pixel value is less than a threshold. The encoder for this embodiment can follow operations described in flowchart 2700 in FIG. 27 and the decoder for this embodiment can follow the operations described in flowchart 2800 in FIG. 28.

Figure 29:
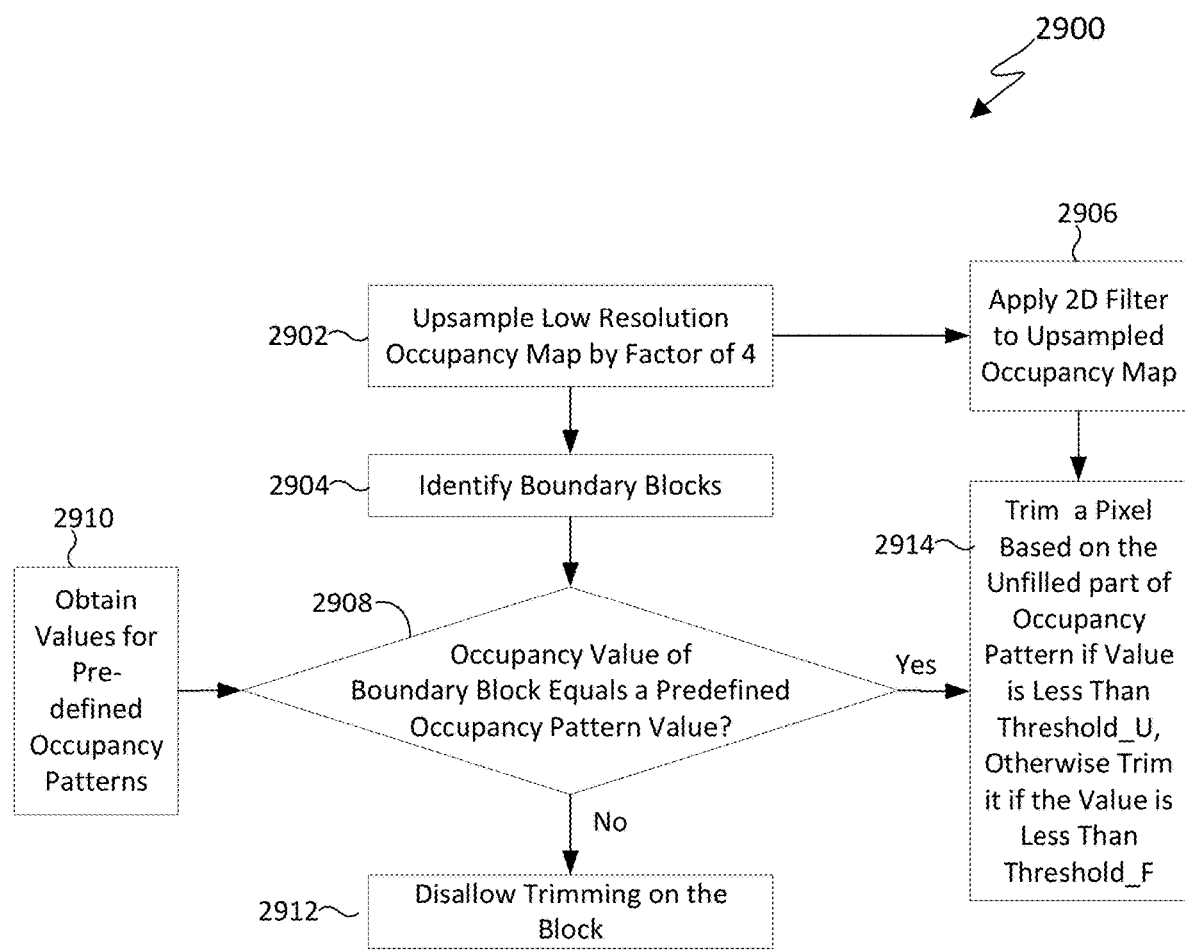
FIG. 29 illustrates a flowchart for occupancy map trimming at a decoder according to various embodiments of this disclosure.

In another embodiment, the occupancy pattern of boundary blocks can be identified in an encoder as described in flowchart 2700 in FIG. 27 but at the decoder, a pixel corresponding to the unfilled part of the pre-defined occupancy pattern can be trimmed if its value is less than a predefined threshold (e.g. threshold_u). A pixel corresponding to the filled part of the occupancy pattern can also be trimmed if its value is less than a pre-defined threshold (e.g. threshold_f). The value of threshold_f will be much larger than threshold_u to limit the number of trimmed pixels from the filled part of the occupancy pattern. FIG. 29 shows the operation of a decoder for this embodiment.

FIG. 29 illustrates a flowchart for trimming an occupancy map at a decoder using an upper and lower threshold according to various embodiments of this disclosure. Operations of flowchart 2900 can be performed by a decoder, such as decoding unit 800 in FIG. 8.

Flowchart 2900 begins at operation 2902 by upsampling the low-resolution occupancy map by a factor corresponding to the occupancy precision value selected for the occupancy map at the encoder. In this illustrative embodiment, the low-resolution occupancy map is upsampled by a factor of 4. Boundary blocks are identified in operation 2904 and a 2D filter is applied to the upsampled occupancy map in operation 2906.

In operation 2908 a determination is made as to whether the occupancy value of a boundary block is equal to a predefined occupancy pattern value obtained from operation 2910. If the occupancy value of a boundary block is not equal to a predefined occupancy pattern value then flowchart 2900 proceeds to operation 2912 where trimming is disallowed on the boundary block. Otherwise, flowchart 2900 proceeds from operation 2908 to operation 2914 to trim a pixel of a boundary block based on the unfilled part of an occupancy pattern if the value is less than a Threshold_U, or trim the filled part of a boundary block based on the filled part of the occupancy patter if the value is less than Threshold_F.

Figure 30:
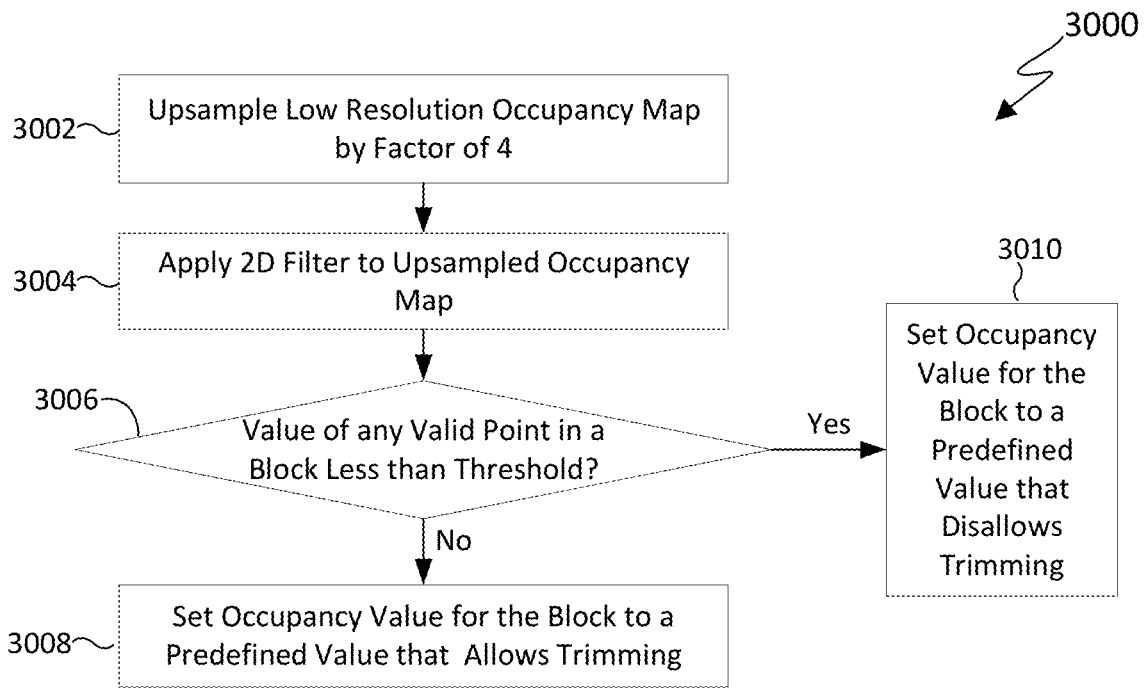
FIG. 30 illustrates a flowchart for determining trimming of an occupancy map according to various embodiments of this disclosure.

In another embodiment, no occupancy pattern defined for boundary blocks. At the encoder, in any boundary block if only the values of extended pixels are less than a pre-defined threshold, the occupancy value of the boundary block in the downsampled occupancy map (i.e. low resolution occupancy map) will be set to a specific value (e.g. 1). That occupancy value means that the boundary block can be trimmed at the decoder. Otherwise, if the value of any pixel from the original high resolution occupancy map is below the threshold, no trimming will be performed on the block and the occupancy value of the boundary block in the downsampled occupancy map (i.e. low resolution occupancy map) will be set to another specific value (e.g. 2). FIG. 30 is a flowchart for an encoder for this embodiment, and FIG. 31 is a flowchart for the decoder for this embodiment.

FIG. 30 illustrates a flowchart for determining trimming of an occupancy map according to various embodiments of this disclosure. Operations of flowchart 3000 can be performed by an encoder, such as encoding unit 700 in server 200 in FIG. 2.

Flowchart 3000 begins at operation 3002 upsampling a low-resolution occupancy map by a factor corresponding to the occupancy precision value selected for the occupancy map at the encoder. In this illustrative embodiment, the low-resolution occupancy map is upsampled by a factor of 4. In operation 3004 a 2D filter is applied to the upsampled occupancy map. A determination is made in operation 3006 as to whether the value of any valid point in a boundary block is less than a threshold. If the value of any valid point in a boundary block is not less than the threshold, then flowchart 3000 proceeds to operation 3008 where the occupancy value for the boundary block is set to a predefined value to indicate trimming is allowed. Otherwise, flowchart 3000 proceeds to operation 3010 where the occupancy value of a boundary block is set to a predefined value that disallows trimming.

Figure 31:
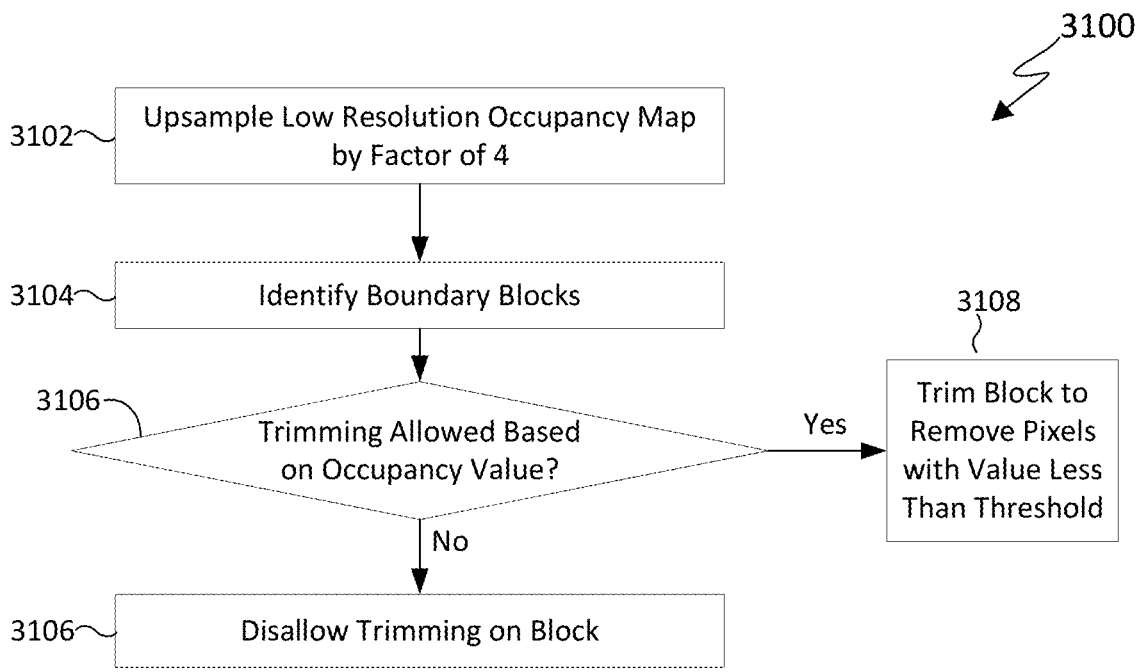
FIG. 31 illustrates a flowchart for occupancy map trimming at a decoder according to various embodiments of this disclosure.

FIG. 31 illustrates a flowchart for trimming an occupancy map at a decoder according to various embodiments of this disclosure. Operations of flowchart 3100 can be performed by a decoder, such as decoding unit 800 in electronic device 300 in FIG. 3.

Flowchart 3100 begins at operation 3102 by upsampling a low-resolution occupancy map by a factor corresponding to the occupancy precision value selected for the occupancy map at the encoder. In this illustrative embodiment, the low-resolution occupancy map is upsampled by a factor of 4. In operation 3104 boundary blocks are identified and in operation 3106 a determination is made as to whether trimming is allowed based on an occupancy value assigned to the boundary blocks. If trimming is not allowed based on the occupancy value, then flowchart 3100 proceeds to operation 3106 where trimming is disallowed on the boundary blocks. If trimming is allowed based on the occupancy value, then flowchart 3100 proceeds to operation 3108 where the boundary blocks are trimmed to remove pixels with a value that is less than a threshold.

In another embodiment, the occupancy map is compressed in a lossy manner. Occupancy map trimming will be disabled since the occupancy values will be compared against a threshold and get trimmed. Alternatively, if the occupancy map trimming is enabled, the lossy occupancy map threshold is not signaled and inferred to be 0. Following is the syntax for the operation described above:

```
if( lossy_occupancy_map_flag ) {
    occupancy_map_trimming_flag = 0
}
else {
    occupancy_map_trimming_flag = 1
}
```

Syntax for the alternative implementation is as follow:

```
if( occupancy_map_trimming_flag ) {
    lossy_occupancy_map_threshold = 0
}
else {
    lossy_occupancy_map_flag = 1
}
```

FIG. 32 illustrates an occupancy map frame with boundary blocks trimmed based on outer corner points according to various embodiments of this disclosure. The occupancy map 3200 includes a patch 3202 with the area in white representing occupied/valid pixels and surrounding darkened pixels representing unoccupied/invalid pixels. An area 3200a of occupancy map 3200 is shown in more detail with the outer corner points 3204 identified.

Figure 32A:
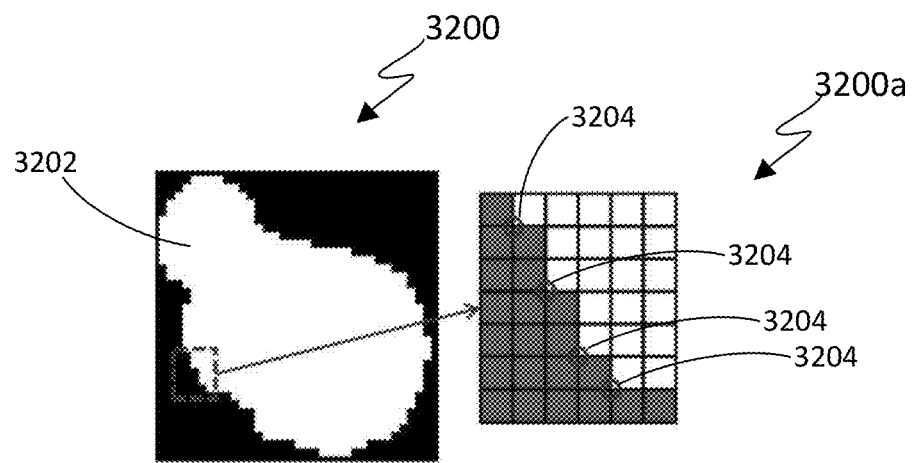
FIGS. 32A-C illustrate an occupancy map with boundary blocks trimmed based on outer corner points according to various embodiments of this disclosure.
Figures 32B, 32C:
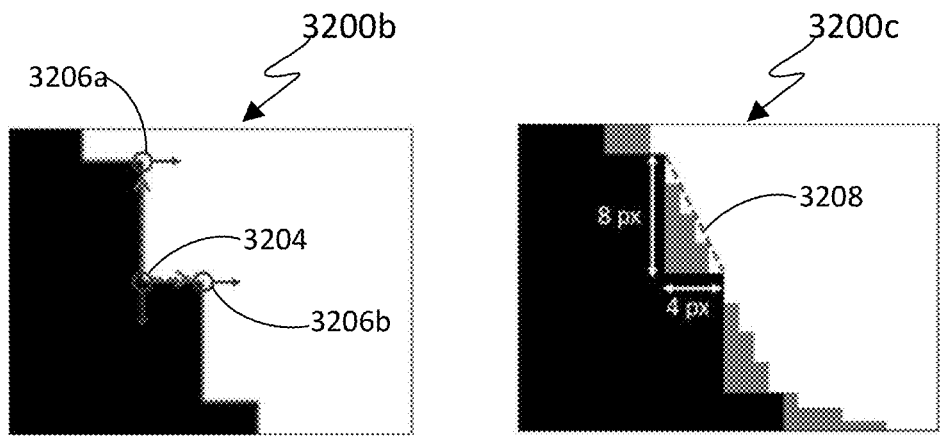

For an outer corner point 3204, its horizontal end 3206b is found by forwarding to the right or left side, and its vertical end 3206a is found by forwarding to the top or bottom side according to the outer corner point's location as shown in FIG. 32A. The horizontal and vertical ends are linked to construct an oblique line 3208, as shown in FIG. 32C and the occupancy value of the pixels outside the oblique line, i.e., between the oblique line 3208 and the unoccupied pixels, will be set to a value indicating that the pixels are unoccupied. In a non-limiting embodiment, the value is zero. Additionally, the distance from the outer corner point 3204 to the horizontal end 3206n is no more than B0 pixels in the case of precision B0=4.

Figure 33:
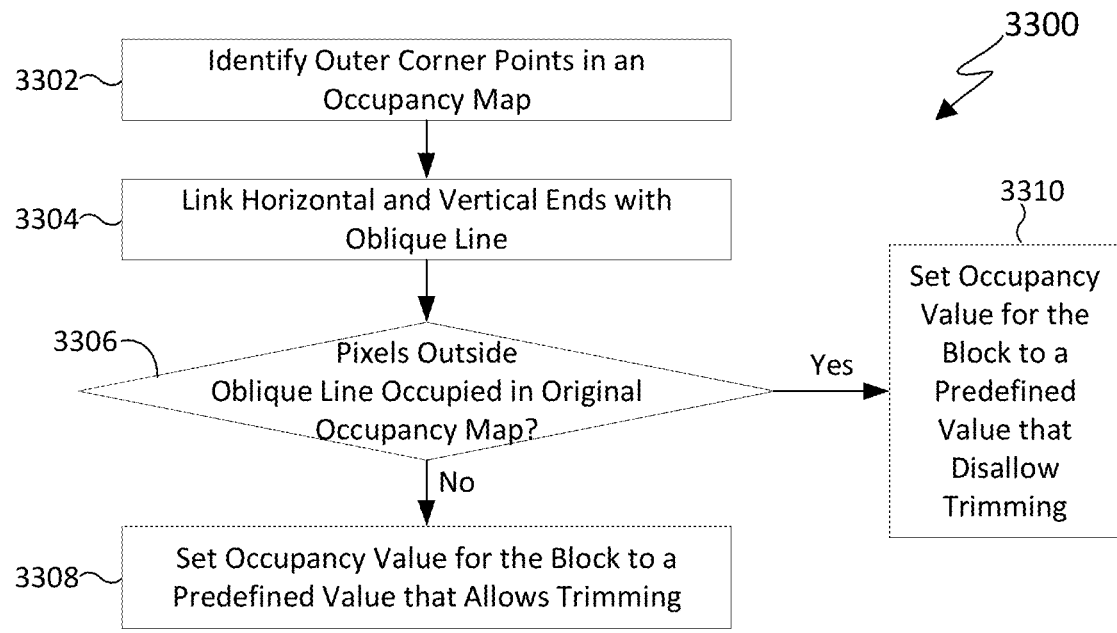
FIG. 33 illustrates a flowchart for identifying boundary blocks for trimming based on outer corner points according to various embodiments of this disclosure.
Figure 34:
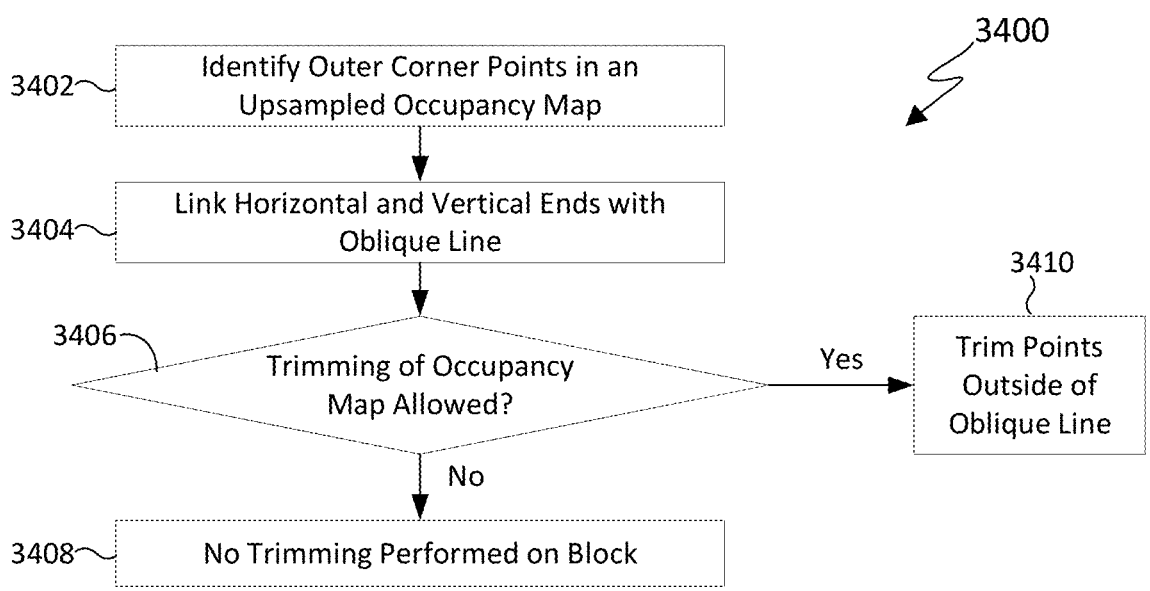
FIG. 34 illustrates a flowchart for boundary blocks trimming at a decoder based on outer corner points according to various embodiments of this disclosure.

For this embodiment, at the encoder, a boundary block (i.e., 4×4 pixels) can be identified as trimmable only if none of the light-colored pixels outside of the oblique line 3008 is occupied in the original high-resolution occupancy map. Otherwise, no trimming will be allowed on the block and the occupancy value of the boundary block in the downsampled occupancy map (i.e. low-resolution occupancy map) will be set to another specific value (e.g. 2). FIGS. 33 and 34 are flowcharts of operations for the encoder and the decoder for this embodiment, respectively.

FIG. 33 illustrates a flowchart for trimming boundary blocks at an encoder based on outer corner points according to various embodiments of this disclosure. Operations of flowchart 3300 can be performed by an encoder, such as encoding unit 800 in FIG. 8. The encoder can be included in a server, such as server 200 in FIG. 2 or an electronic device such as electronic device 300 in FIG. 3.

Flowchart 3300 beings at operation 3302 by identifying outer corner points in an occupancy map. In operation 3304 the horizontal ends and vertical ends of the outer corner points are linked with an oblique line. Thereafter, a determination is made in operation 3306 as to whether pixels outside the oblique line are occupied in the original occupancy map. If pixels outside the oblique line are not occupied in the original occupancy map, then the flowchart 3300 proceeds to operation 3308 and the occupancy value for the boundary block is set to a predefined value that allows trimming. If pixels outside the oblique line are occupied in the original occupancy map, then the flowchart 3300 proceeds to operation 3310 and the occupancy value for the boundary block is set to a predefined value that disallows trimming.

FIG. 34 illustrates a flowchart for trimming boundary blocks at a decoder based on outer corner points according to various embodiments of this disclosure. Operations of flowchart 3400 can be performed by a decoder, such as decoding unit 900 in FIG. 9. The decoder can be included in an electronic device, such as electronic device 300 in FIG. 3, or a server, such as server 200 in FIG. 2.

Flowchart 3400 begins at operation 3402 by identifying the outer corner points in an upsampled occupancy map. In operation 3404 the horizontal ends and vertical ends of the outer corner points are linked with an oblique line. In operation 3406 a determination is made as to whether trimming of the occupancy map is allowed. If trimming of the occupancy map is not allowed, the flowchart 3400 proceeds to operation 3408 and trimming is not performed on the boundary block. However, if trimming of the occupancy map is allowed, then flowchart 3400 proceeds to operation 3410 and points outside of the oblique line are trimmed.

In another embodiment, occupancy map trimming can be performed using a zero-order hold. Operation of the encoder is described in FIG. 35 and operation of the decoder is described in FIG. 36.

Figure 35:
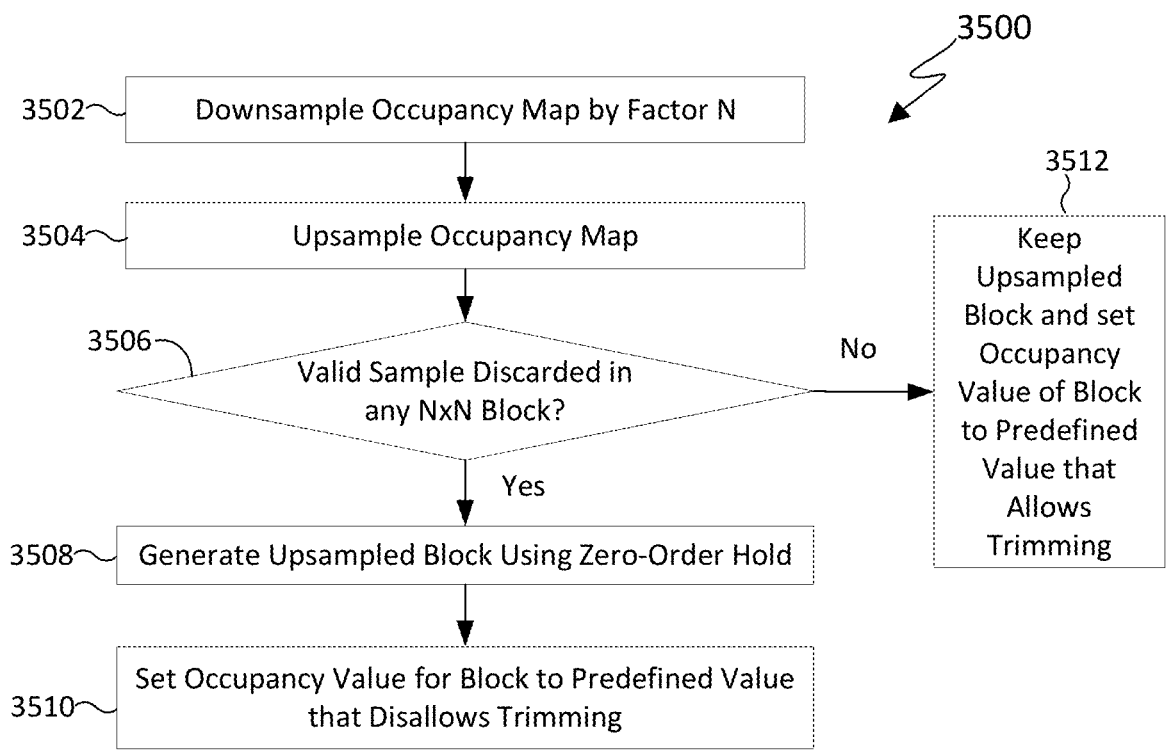
FIG. 35 illustrates a flowchart for occupancy map trimming at an encoder using a zero-order hold according to various embodiments of this disclosure.

FIG. 35 illustrates a flowchart for occupancy map trimming at an encoder using a zero-order hold according to various embodiments of this disclosure. Operations of flowchart 3500 can be performed by an encoder such as encoding unit 800 in FIG. 8. The encoder can be implemented in a server, such as server 200 in FIG. 2 or in an electronic device, such as electronic device 300 in FIG. 3.

Flowchart 3500 begins at operation 3502 by downsampling an occupancy map by a factor of N. In operation 3504 the occupancy map is upsampled and then a determination is made in operation 3506 as to whether any valid sample is discarded in an N×N boundary block. If valid samples are discarded, then flowchart 3500 proceeds to operation 3508 where an upsampled boundary block is generated using a zero-order hold. In operation 3510, the occupancy value for the boundary block is set to a predefined value that disallows trimming.

At operation 3506, if a determination is made that no valid samples are discarded in an N×N boundary block, then flowchart 3500 proceeds to operation 3512 where the upsampled block is kept and the occupancy value of the block is set to a predefined value that allows for trimming.

Figure 36:
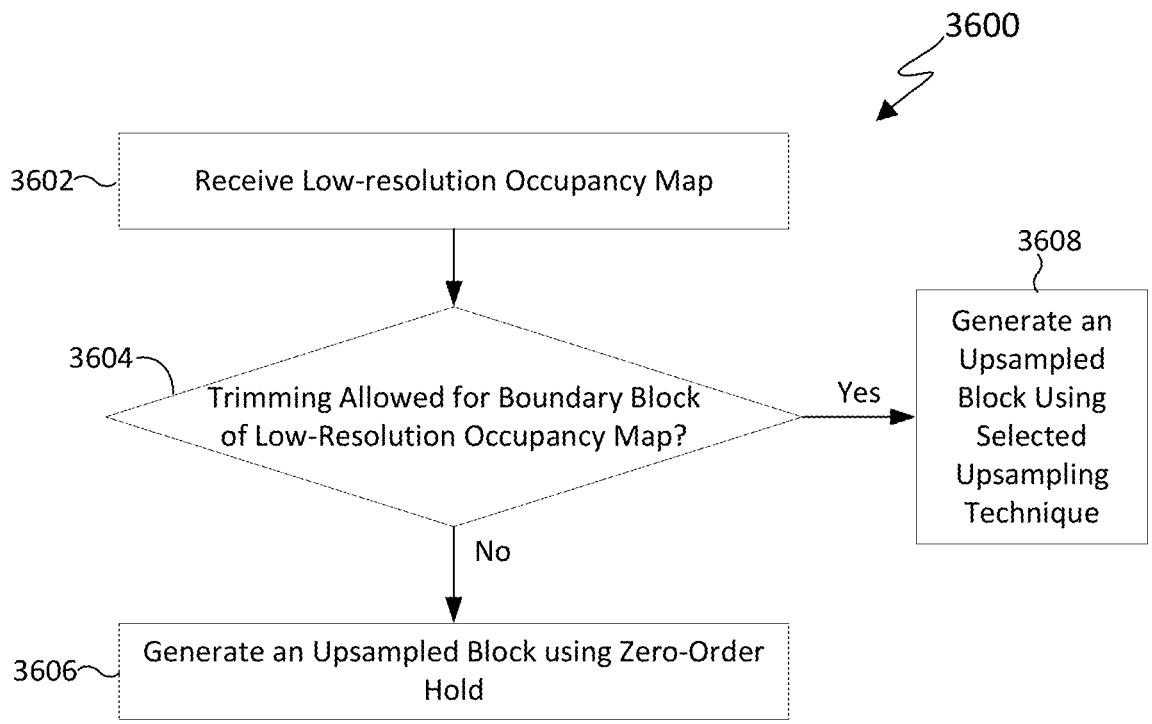
FIG. 36 illustrates a flowchart for occupancy map trimming at a decoder using a zero-order hold according to various embodiments of this disclosure.

FIG. 36 illustrates a flowchart for occupancy map trimming at a decoder using a zero-order hold according to various embodiments of this disclosure. Operations of flowchart 3600 can be performed by a decoder, such as decoding unit 800 in electronic device 300 in FIG. 3.

Flowchart 3600 begins are operation 3602 by receiving a low-resolution occupancy map. In operation 3604, a determination is made as to whether trimming is allowed for a boundary block of the low-resolution occupancy map. If trimming is not allowed, then flowchart 3600 proceeds to operation 3606 where an upsampled block is generated using a zero-order hold. If trimming is allowed at operation 3604, then flowchart 3600 proceeds to operation 3608 where an upsampled boundary block is generated using a selected upsampling technique.

In one or more of the embodiments disclosed herein, occupancy map signaling can be achieved by using a flag. For example, a flag may be used to signal whether the occupancy map may be trimmed on the decoder side. This flag can be set to 1 to indicate that the occupancy map may be trimmed on the decoder side under certain conditions. This flag could be at various levels (i.e. sequence and frame levels). Such a flag may be named occupancyMapTrimmingEnabledFlag.

Another flag may be used to signal whether constrained occupancy map trimming as described in the embodiments above is combined with any other occupancy map trimming/filtering technique. For example, a value of 1 for this flag indicates that occupancy map trimming/filtering is constrained so that no valid points from the original occupancy map (or very few) are discarded. It also indicates that occupancy map value controls whether to apply trimming/filtering to the corresponding N×N block. In this case, for some blocks, occupancy map trimming/filtering may be applied whereas for other blocks all the occupancy map values in an N×N block are set to the corresponding occupancy map value at the lower resolution. This flag could be at the sequence and the frame levels and can be named constrainedOccupancyMapTrimmingEnabledFlag.

In some embodiments, if constrainedOccupancyMapTrimmingEnabledFlag is 1 then occupancyMapTrimmingEnabledFlag is 1 as well. Alternatively, the constrainedOccupancyMapTrimmingEnabledFlag flag may be signaled conditionally. That is, it is signaled only when occupancyMapTrimmingEnabledFlag is 1.

In an alternate embodiment, a single flag controls constrained occupancy map trimming. If such a flag is 1, occupancy map trimming/filtering may be applied to an N×N block depending on the value of the corresponding occupancy map. If this flag is 0, no occupancy map trimming/filtering is used.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An encoding device for point cloud compression of a three-dimensional (3D) point cloud, the encoding device comprising:
 a communication interface configured to transmit a bitstream; and
 a processor operably connected to the communication interface, the processor configured to:
  generate, for the 3D point cloud, at least a set of geometry frames that provides coordinates for points in the 3D point cloud;
  generate a set of occupancy map frames that indicates whether the points of the 3D point cloud are valid for coding;
  select an occupancy precision value based on a quantization parameter (QP) associated with at least one generated geometry frame in the set of geometry frames, wherein the selected occupancy precision value is a first value when the QP is less than a first QP threshold, wherein the selected occupancy precision value is a second value that is higher than the first value when the QP is between the first QP threshold and a second QP threshold, and wherein the selected occupancy precision value is a third value that is higher than the second value when the QP is greater than the second QP threshold;
  subsample at least one occupancy map frame in the set of occupancy map frames based on the selected occupancy precision value;
  encode the set of geometry frames and the set of occupancy map frames into a bitstream; and
  transmit, via the communication interface, the bitstream.

2. The encoding device of claim 1, wherein the first value is 1, wherein the second value is 2, and wherein the third value is 4.

3. The encoding device of claim 1, wherein when the selected occupancy precision value is the second value or the third value, to subsample the at least one occupancy map frame, the processor is further configured to:
 subsample interior blocks of the at least one occupancy map frame with the selected occupancy precision value; and
 subsample exterior blocks of the at least one occupancy map frame with a lower occupancy precision value when the exterior blocks are partially filled.

4. The encoding device of claim 3, wherein the processor is further configured to:
  transmit, via the communication interface, one or more subblock occupancy indicators, wherein the one or more subblock occupancy indicators are transmitted in the at least one occupancy map frame or in a supplemental enhancement information (SEI) message.

5. The encoding device of claim 1, wherein the processor is further configured to:
  generate a set of atlas frames that contain information about individual patches.

6. The encoding device of claim 1, wherein the set of occupancy map frames includes at least another occupancy map frame, and wherein the processor is further configured to:
  determine another occupancy precision value that differs from the selected occupancy precision value; and
  subsample the other occupancy map frame with the other occupancy precision value.

7. The encoding device of claim 1, wherein the selected occupancy precision value is based on (i) a percentage of invalid pixels at a highest occupancy precision value and (ii) a ratio of bits for the at least one occupancy map frame and bits for at least one generated geometry frame in the generated set of geometry frames, and wherein the at least one occupancy map frame corresponds to the at least one generated geometry frame.

8. A method for point cloud compression of a three-dimensional (3D) point cloud, the method comprising:
  generating, for the 3D point cloud, at least a set of geometry frames that provides coordinates for points in the 3D point cloud;
  generating a set of occupancy map frames that indicates whether the points of the 3D point cloud are valid for coding;
  selecting an occupancy precision value based on a quantization parameter (QP) associated with at least one generated geometry frame in the set of geometry frames, wherein the selected occupancy precision value is a first value when the QP is less than a first QP threshold, wherein the selected occupancy precision value is a second value that is higher than the first value when the QP is between the first QP threshold and a second QP threshold, and wherein the selected occupancy precision value is a third value that is higher than the second value when the QP is greater than the second QP threshold;
  subsampling at least one occupancy map frame in the set of occupancy map frames based on the selected occupancy precision value;
  encoding the set of geometry frames and the set of occupancy map frames into a bitstream; and
  transmitting the bitstream.

9. The method of claim 8, wherein the first value is 1, wherein the second value is 2, and wherein the third value is 4.

10. The method of claim 8, wherein when the selected occupancy precision value is the second value or the third value, subsampling the at least one occupancy map frame further comprises:
  subsampling interior blocks of the at least one occupancy map frame with the selected occupancy precision value; and
  subsampling exterior blocks of the at least one occupancy map frame with a lower occupancy precision value when the exterior blocks are partially filled.

11. The method of claim 10, further comprising:
  transmitting one or more subblock occupancy indicators, wherein the one or more subblock occupancy indicators are transmitted in the at least one occupancy map frame or in a supplemental enhancement information (SEI) message.

12. The method of claim 8, further comprising:
  generating a set of atlas frames that contain information about individual patches.

13. The method of claim 8, wherein the set of occupancy map frames includes at least another occupancy map frame, the method further comprising:
  determining another occupancy precision value that differs from the selected occupancy precision value; and
  subsampling the other occupancy map frame with the other occupancy precision value.

14. The method of claim 8, wherein the selected occupancy precision value is based on (i) a percentage of invalid pixels at a highest occupancy precision value and (ii) a ratio of bits for the at least one occupancy map frame and bits for at least one generated geometry frame in the generated set of geometry frames, and wherein the at least one occupancy map frame corresponds to the at least one generated geometry frame.

15. A decoding device for point cloud compression of a 3D point cloud, the decoding device comprising:
  a communication interface configured to receive a bitstream; and
  a processor operably connected to the communication interface, the processor configured to:
    decode the bitstream into at least a set of geometry frames that provides coordinates for points in the 3D point cloud;
    decode the bitstream into a set of occupancy map frames that indicates whether the points of the 3D point cloud are valid for coding;
    obtain an occupancy precision value based on a quantization parameter (QP) associated with at least one decoded geometry frame in the set of geometry frames, wherein the obtained occupancy precision value is a first value when the QP is less than a first QP threshold, wherein the obtained occupancy precision value is a second value that is higher than the first value when the QP is between the first QP threshold and a second QP threshold, and wherein the obtained occupancy precision value is a third value that is higher than the second value when the QP is greater than the second QP threshold;
    upsample at least one occupancy map frame in the set of occupancy map frames based on the obtained occupancy precision value; and
    generate the 3D point cloud using the set of geometry frames and the set of occupancy map frames.

16. The decoding device of claim 15, wherein the first value is 1, wherein the second value is 2, and wherein the third value is 4.

17. The decoding device of claim 15, wherein when the obtained occupancy precision value is the second value or the third value, to upsample the at least one occupancy map frame, the processor is further configured to:
  upsample interior blocks of the at least one occupancy map frame with the obtained occupancy precision; and
  upsample exterior blocks of the at least one occupancy map frame with a lower occupancy precision value based on one or more subblock indicators.

18. The decoding device of claim 17, wherein the one or more subblock indicators are received in the at least one occupancy map frame or in a supplemental enhancement information (SEI) message.

19. The decoding device of claim 15, wherein the set of occupancy map frames includes at least another occupancy map frame, and wherein to the processor is further configured to:

determine another occupancy precision value that differs from the obtained occupancy precision value; and upsample the other occupancy map frame with the other occupancy precision value.

20. The decoding device of claim 15, wherein the obtained occupancy precision value is based on (i) a percentage of invalid pixels at a highest occupancy precision value and (ii) a ratio of bits for the at least one occupancy map frame and bits for at least one decoded geometry frame in the decoded set of geometry frames, and wherein the at least one occupancy map frame corresponds to the at least one decoded geometry frame.

* * * * *